US012585553B2

(12) United States Patent
Lynch et al.

(10) Patent No.: US 12,585,553 B2
(45) Date of Patent: Mar. 24, 2026

(54) REMOTE FILE SERVICE SYSTEM FOR FILE OPERATIONS

(71) Applicant: Ab Initio Technology LLC, Lexington, MA (US)

(72) Inventors: Frank Lynch, Concord, MA (US); Arkadi Popov, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/778,121

(22) Filed: Jul. 19, 2024

(65) Prior Publication Data

US 2025/0258740 A1      Aug. 14, 2025

Related U.S. Application Data

(60) Provisional application No. 63/551,978, filed on Feb. 9, 2024.

(51) Int. Cl.
| | |
|---|---|
| *G06F 16/00* | (2019.01) |
| *G06F 11/1446* | (2026.01) |
| *G06F 16/13* | (2019.01) |
| *G06F 16/18* | (2019.01) |
| *G06F 16/182* | (2019.01) |

(52) U.S. Cl.
CPC .......... *G06F 11/1464* (2013.01); *G06F 16/13* (2019.01); *G06F 16/1815* (2019.01); *G06F 16/183* (2019.01)

(58) Field of Classification Search
None
See application file for complete search history.

(56) References Cited

U.S. PATENT DOCUMENTS 11,204,818 B1 * 12/2021 Kunz ...................... G06F 9/542

OTHER PUBLICATIONS

Bach et al. (CN-109906597-B), "Storing and Retrieving Restricted Data Sets and Non-restricted Data Sets to and From a Cloud Network", Sep. 10, 2021, 15 Pages. (Year: 2021).*
Maybee et al. (CN 110100240 B) "Cloud Gateway for ZFS Snapshot Generation and Storage", Dec. 12, 2023, 43 Pages. (Year: 2023).*

(Continued)

*Primary Examiner* — Bai D Vu
(74) *Attorney, Agent, or Firm* — Fish & Richardson P.C.

(57) ABSTRACT

A method implemented by data processing systems enables usage of a cloud object storage for storing data accessed based on execution of file operations that are unsupported by the cloud object storage. The method includes executing an application configured to access application data; as the application executes, generating instructions to perform operations, unsupported by cloud object storage, to modify the application data; transmitting the instructions to a first file service system representing a location for the application data to be stored in the cloud object storage; recording an indication of the operations specified by the instructions; and transmitting, to the cloud object storage, the indication of the operations specified by the instructions, whereby transmittal of the indication to cloud object storage enables a second data processing system to access the application data that is modified in accordance with the operations unsupported by cloud object storage.

24 Claims, 28 Drawing Sheets

(56) References Cited

OTHER PUBLICATIONS

Cho et al., "ArkFS: A Distributed File System on Object Storage for Archiving Data in HPC Environment," Paper, Presented at Proceedings of the 2023 IEEE International Parallel and Distributed Processing Symposium (IPDPS), St. Petersburg, FL, May 15-19, 2023, pp. 301-311.

International Search Report and Written Opinion in International Appln. No. PCT/US2025/014994, mailed on Apr. 11, 2025, 13 pages.

Mao et al., "Somersault Cloud: Toward a cloud-of-clouds Service for Personal Backup," Paper, Presented at Proceedings of the 2013 International Conference on Computing, Networking and Communications (ICNC), San Diego, CA, Jan. 28-31, 2013, pp. 461-464.

3cloudsolutions.com [online], "Azure Data Lake Storage GEN2: 10 Things You Need to Know," available on or before Oct. 4, 2023, via Internet Archive: Wayback Machine URL <https://web.archive.org/web/20231004140647/https:/3cloudsolutions.com/resources/azure-data-lake-storage-gen2-10-things-you-need-to-know/>, retrieved on Jan. 15, 2025, retrieved from URL <https://3cloudsolutions.com/resources/azure-data-lake-storage-gen2-10-things-you-need-to-know/>, 13 pages.

Brin et al., "The Anatomy of a Large-Scale Hypertextual Web Search Engine," Computer Networks and ISDN Systems, Apr. 1993, 30(1-7):107-117.

Ismail et al., HopsFS-S3: Extending Object Stores with POSIX-like Semantics and more (industry track), Presented at the Proceedings of the 21st International Middleware Conference Industrial Track, Dec. 7-11, 2020, Delft, Netherlands, pp. 23-30.

* cited by examiner

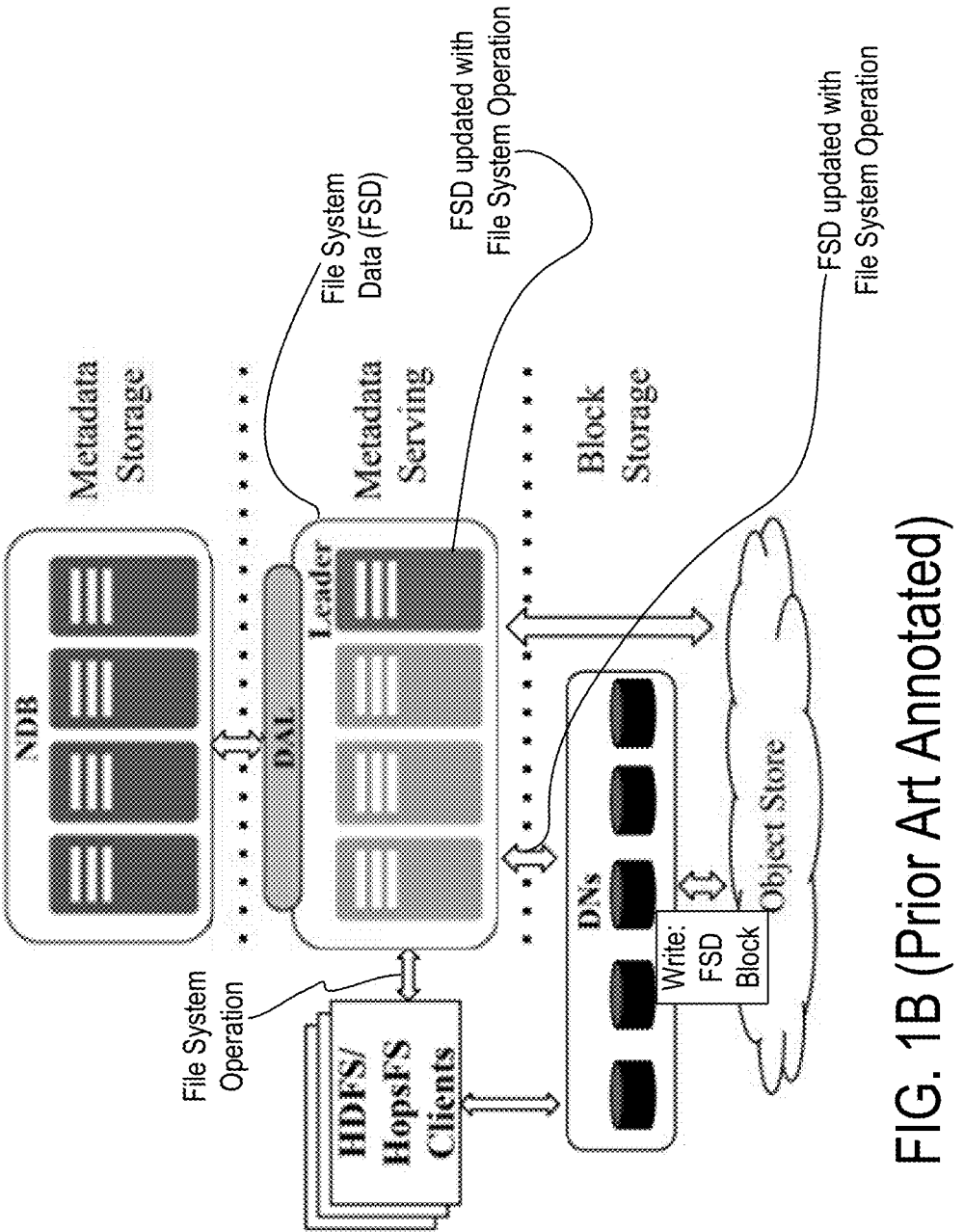
FIG. 1B (Prior Art Annotated)

800—↘

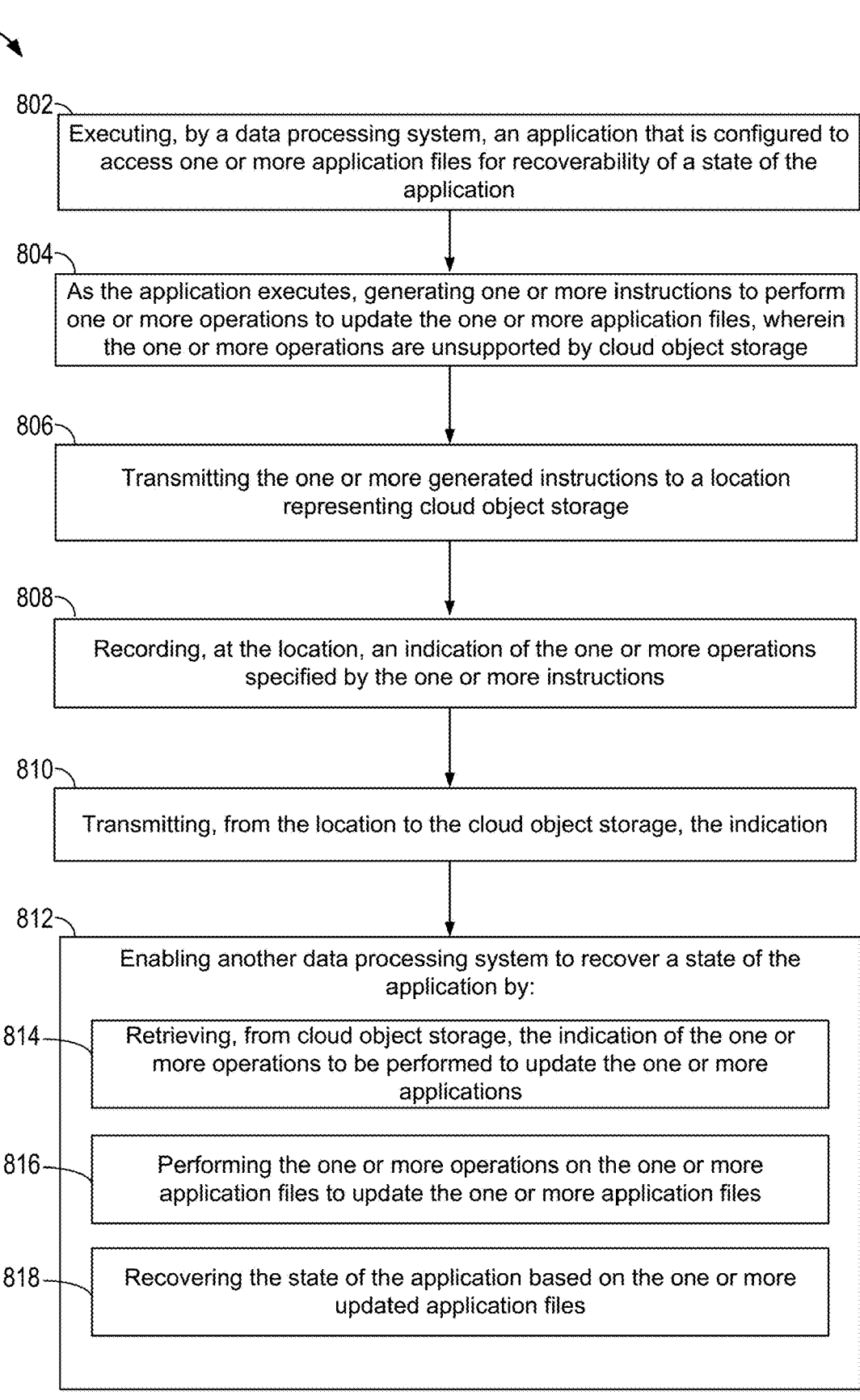

802— Executing, by a data processing system, an application that is configured to access one or more application files for recoverability of a state of the application 804— As the application executes, generating one or more instructions to perform one or more operations to update the one or more application files, wherein the one or more operations are unsupported by cloud object storage 806— Transmitting the one or more generated instructions to a location representing cloud object storage 808— Recording, at the location, an indication of the one or more operations specified by the one or more instructions 810— Transmitting, from the location to the cloud object storage, the indication 812— Enabling another data processing system to recover a state of the application by:

814— Retrieving, from cloud object storage, the indication of the one or more operations to be performed to update the one or more applications 816— Performing the one or more operations on the one or more application files to update the one or more application files 818— Recovering the state of the application based on the one or more updated application files

FIG. 8

REMOTE FILE SERVICE SYSTEM FOR FILE OPERATIONS

CLAIM OF PRIORITY

This application claims priority under 35 U.S.C. § 119 (e) to U.S. Patent Application Ser. No. 63/551,978, filed on Feb. 9, 2024, the entire contents of which are hereby incorporated by reference.

BACKGROUND

This disclosure relates to techniques for efficiently operating a data processing system with many datasets that may be stored in any of a large number of data stores.

Modern data processing systems manage vast amounts of data within an enterprise. A large institution, for example, may have millions of datasets. These datasets can support multiple aspects of the operation of the enterprise. Complex data processing systems typically process data in multiple stages, with the results produced by one stage being fed into the next stage.

To support a wide range of functions, a data processing system may execute applications, whether to implement routine processes or to extract insights from the datasets. The applications may be programmed to access the data stores to read and write data.

As described in "HopsFS-S3: Extending Object Stores with POSIX-like Semantics and more (industry track)", FIG. 1A shows "block storage servers as data-nodes (DNs) that are a collection of storage types such as DISK, SSD, and RAM_DISK". FIG. 1B is an annotated version of FIG. 1A.

SUMMARY

This disclosure describes a remote file service (RFS) that provides file operations assistance for remote directories located on a storage type (e.g., cloud object storage) that does not provide all types of file operations, such as a full set of Portable Operating System Interface (POSIX)-style file operations that are used by applications (or jobs within applications). Generally, a job refers to a unit of work within an application. A job can access a set of application files and perform rename operations, update operations, lock operations, append operations, and so forth on the application files for the application.

The application accesses the application files from a storage, such as memory or other storage. Reliable storage of the application files can ensure that an application can retrieve an application state (such as if processing is interrupted) or recover an application state (such as when a job fails during execution). When a processing workflow of a job fails or is interrupted, such as due to file corruption, loss of a network connection, memory failure, or other fault, the job can restart from a checkpoint to recover the processing workflow that failed and resume processing without requiring the application to restart the processing workflow from an initial state. A checkpoint refers to stored application files representing a state of the application during a processing workflow that includes all data for resuming the application processing from that state. This can include intermediate data of calculations, temporary metadata files, and so forth.

Cloud object storage is reliable and can be accessible from any machine. As such, cloud object storage can be used for storing the application files, such as recovery data for recovering processing workflows from a checkpoint. However, cloud object storage is not a traditional hierarchical file system. As such, cloud object storage is sub-optimal for certain POSIX-style file operations (e.g., update, append, etc.) that are typically used by application jobs in generating or updating application files, such as recovery data. For example, cloud object storage may not directly support these operations on the data stored in the cloud. Because of this, cloud object storage—on its own—can be too cumbersome for storage of recovery data, because cloud object storage can introduce high latencies and thus be slow for rapid writing of data to the object storage.

To address this problem, the systems and methods described herein include a remote file service (RFS) that is an interface for cloud object storage. The application file designates an RFS system as an interface for files being stored in cloud object storage (COS). The designated RFS system receives instructions for performing POSIX-style file operations for files that the application designates for storage in cloud object storage. Generally, these files can be recovery files stored as a backup to local storage on a data processing system that is executing the job for an application. The RFS system (e.g., a data processing server) locally executes the POSIX-style file operations in a logical representation of an application file (or a logical file). The local execution is performed by recording the operations that change the application files (such as recovery data) in a journal file. The journal file specifies the operations are locally executed in the logical file. The locations in the journal file of recorded operations relating to particular application files (e.g., a set of one or more files for a checkpoint) are stored in a journal index associated with the journal file. In an example, to access application files for a particular checkpoint, the RFS system accesses the journal index to find the application files of the particular checkpoint in one or more journal files. The RFS system can then retrieve the list of operations for the application. The RFS server then transmits the journal files and the associated index to the cloud object storage so that the recovery data are available through cloud object storage to one or more data processing systems, including the original data processing system executing the job(s) of the application. The RFS system can retrieve the journal files and associated index from the cloud object storage. As such, the RFS system enables the cloud object storage to be used as a POSIX-style system from the perspective of the executing application.

Through the RFS system, recovery data can be reconstructed from the journal file by the application when the application is recovering from a failed job. When a data processing system executing an application fails, and the local RFS system (which may also be hosted on the data processing system) fails, the application can instantiate (spin up) another instance of the data processing system and/or RFS system to restart the failed job of the application. The new instance of the RFS system does not have any stored application files, such as the journal files. The RFS system retrieves the journal files from the cloud object storage responsive to a request from the application. To reconstitute the application files as the local data processing system of the application and restart the failed job, the RFS extracts, from the journal files, a set of operations that were performed on the application files and recorded in the journal files until the designated checkpointed state. The RFS sends the instructions corresponding to the extracted operations to the data processing system to cause the application to perform the extracted operations on the application files and restore the application to the last checkpointed state. The application can then resume execution of the job.

In an aspect, the RFS directory has a file model with both a logical structure and a physical structure. The logical structure specifies the files and subdirectories created by a job at run-time. The physical structure of the RFS directory specifies the journal files that are generated by the RFS and the subdirectories where the RFS stores the journal files. In this example, to use the journal files, the RFS server locally maintains the file model of the RFS directory. When the RFS executes a POSIX-style operation, the RFS updates the local file model, records the operation in a journal file, and sends the journal file to the cloud object store when a commit is desired (e.g., periodically). When a job fails, the RFS retrieves the journal files for the failed job. Using the retrieved log files, the RFS rebuilds the logical structure to begin performing the new file operations for the job.

Latency may exist when writing the log files to cloud object storage. To address this latency, the journal files are stored locally (in memory or on disk) on a server running RFS (an RFS server) and a schema of the log files are output to other nodes. By storing the log files locally and outputting the schema to other nodes, the job does not need to wait for the log files to be committed to the cloud object storage. Instead, the job can continue running. If a problem occurs with committing the log files to the cloud object storage, the RFS server can retrieve the log files from memory or from any of the other nodes (which are referred to as RFS surrogates).

In a general aspect, a method is implemented by one or more data processing systems to enable usage of a cloud object storage for storing accessed data based on execution of one or more file operations that are unsupported by the cloud object storage. The method includes executing, by a first data processing system, an application, wherein the application is configured to access application data; as the application executes, generating one or more instructions to perform one or more operations to modify the application data, wherein the one or more operations are unsupported by cloud object storage; transmitting the one or more instructions to a first file service system representing a location for the application data to be stored in cloud object storage; recording, at the first file service system, an indication of the one or more operations specified by the one or more instructions; and transmitting, from the first file service system to the cloud object storage, the indication of the one or more operations specified by the one or more instructions, whereby transmittal of the indication to cloud object storage enables a second data processing system to access the application data that is modified in accordance with the one or more operations unsupported by cloud object storage.

In an aspect including one or more of the previous aspects, the method includes recovering, by the second data processing system, a state of the application when the application failed by performing operations including: retrieving, from cloud object storage, the indication of one or more operations to be performed on the application data, the one or more operations updating the application data to be at the state of the application when the application failed; performing the one or more file operations on the application data to update the application data; and recovering the state of the application based on the updated application data.

In an aspect including one or more of the previous aspects, the second data processing system is the first data processing system executing the application.

In an aspect including one or more of the previous aspects, transmitting the one or more instructions to the first file service system includes: transmitting the one or more instructions to the location representing cloud object storage; intercepting the one or more instructions that are transmitted; generating an index specifying a given application file and a location in a journal file pertaining to an application file of the application data; and identifying which application files of the application data are needed for recoverability of the application.

In an aspect including one or more of the previous aspects, the method includes receiving a request for recoverability data; retrieving, from the cloud object storage, the indication of the one or more operations specified by the one or more instructions; and re-constructing the recoverability data in accordance with the indication of the one or more operations specified by the one or more instructions.

In an aspect including one or more of the previous aspects, the method includes sending, to a restarted data processing system, data representing one or more operations for recovering a job for execution on the restarted data processing system.

In an aspect including one or more of the previous aspects, the one or more file operations are unsupported by the cloud object storage.

In an aspect including one or more of the previous aspects, the one or more file operations include an instruction to update a structure of application files of the application.

In an aspect including one or more of the previous aspects, the one or more instructions represent operations to restore the application to a checkpointed state.

In an aspect including one or more of the previous aspects, recording, at the first file service system, the indication of the one or more operations specified by the one or more instructions includes generating one or more journal files that journal a list of the one or more operations.

In an aspect including one or more of the previous aspects, the one or more journal files are associated with a journal index that specifies a location in the one or more journal files corresponding to at least one application file of application data.

In an aspect including one or more of the previous aspects, the method includes specifying the location based on a directory tag, the directory tag indicating a directory for storing the data of the application by the application.

In an aspect including one or more of the previous aspects, the first file service system is at a server remote from the data processing system executing the application.

In an aspect including one or more of the previous aspects, the first file service system is part of the data processing system executing the application.

In an aspect including one or more of the previous aspects, the first file service system stores the application data of the application as logical files, the logical files representing at least one directory of the data stored at the data processing system, the logical files configured to be reconstituted based on the one or more file operations specified by the one or more instructions.

In an aspect including one or more of the previous aspects, the method includes generating an instruction specifying a particular first file service system for storing files at the cloud object storage, the particular first file service system being one of a set of available file service systems for storing files at the cloud object storage.

In an aspect including one or more of the previous aspects, transmitting, from the first file service system to the cloud object storage, the indication is responsive to a commit checkpoint instruction received from the data processing system.

In an aspect including one or more of the previous aspects, the indication includes: a journal file in which the file operations to update the application data of the application are recorded; and a journal index including a mapping between the journal file and application data of the application, wherein locations in the journal file of recorded file operations associated with the application data are stored in the journal index.

In an aspect including one or more of the previous aspects, the method includes receiving, at a second file service system, a request for a designated checkpoint state; in response to the received request for the designated checkpoint state, retrieving, by the second file service system and from the cloud object storage, the indication including the journal index and journal files including the journal file; accessing, by the second file service system, the journal index to identify in the journal files the application data that are associated with the designated checkpoint state; extracting, by the second file service system, from the journal files a set of operations that were performed on the identified application data and recorded in the journal files until the designated checkpointed state; and transmitting, by the second file service system, a set of instructions corresponding to the extracted operations to the second data processing system to cause the application to perform the extracted file operations on the application data and recover the application to the designated checkpointed state based on the updated application data.

In an aspect including one or more of the previous aspects, the first file service system includes the second file service system.

In an aspect including one or more of the previous aspects, the first file service system is different from the second file service system.

In an aspect including one or more of the previous aspects, the first file service system is remote from the second file service system.

In an aspect including one or more of the previous aspects, transmitting the one or more instructions to the first file service system representing a location for data to be stored in the cloud object storage occurs asynchronously with respect to transmittal of other generated instructions by other executing instances of the application to the first file service system; and where transmitting the indication, from the first file service system to the cloud object storage, occurs synchronously with transmission of other indications of the one or more instructions for storage in the cloud object storage.

In an aspect including one or more of the previous aspects, the method includes initializing a second file service system; transmitting the one or more instructions to the first file service system representing the location for data to be stored in the cloud object storage, transmitting the one or more instructions to the second file service system representing the location for the application data to be stored in the cloud object storage; and determining, at a synchronization system, that the first file service system and the second file service system are synchronized when each of the one or more instructions received by the first file service system is also received by the second file service system.

In an aspect including one or more of the previous aspects, the method includes determining that the first file service system is offline; determining that the second file service system has not received each of the one or more instructions received by the first file service system; causing the application to roll back execution of the application to a previous state corresponding to a synchronization between the first file service system and the second file service system; and causing the application to restart at the previous state, the application being configured to transmit one or more additional instructions to the second file service system as the application restarts execution.

In an aspect including one or more of the previous aspects, wherein the one or more instructions include Portable Operating System Interface (POSIX) operations.

In an aspect including one or more of the previous aspects, the one or more operations are native to an operating system associated with the run-time environment.

In an aspect, a data processing system including a memory and one or more processors for performing the operations of any of the foregoing methods.

In an aspect, one or more non-transitory computer-readable hardware storage devices storing instructions that, when executed by one or more processors, enable the one or more processors to perform operations of any of the foregoing methods.

In an aspect, a computer program including instructions that, when executed by one or more computers, enable the one or more computers to perform the method of any of the foregoing methods.

In an aspect, a data processing system including a memory and one or more processors for performing the operations of one or more of the previous aspects.

In an aspect, one or more non-transitory computer-readable hardware storage devices storing instructions that, when executed by one or more processors, enable the one or more processors to perform operations of one or more of the previous aspects. One or more of the above aspects may include one or more features described herein or one or more of the following features.

One or more of the above aspects may provide one or more of the following advantages. The interface (e.g., RFS) and data processing systems described herein are configured to extend cloud object storage with file operation functionality (e.g., POSIX-like functionality). This allows to combine the global accessibility and storage reliability of a cloud object storage with the possibility to perform file operations to update application files. Such a combination is especially beneficial for recovery of an application state because failure of an application or a data processing system executing the application does not affect the cloud object storage and recovery data stored in the cloud object storage can be used to perform file operations on application files to recover an application state and resume execution of the application even on different data processing systems. The interface (RFS system) uses local storage for both performance and efficiency reasons. The interface (RFS system) does not need to use external storage in combination with a metadata layer for reading and analyzing recovery data. This combination of external storage with a metadata layer can introduce latency. However, this latency is not present when the interface (RFS) locally rebuilds and stores the logical structure of the file model. The interface (RFS) is configured for replication of the schema across multiple memories. The replication can eliminate or reduce latency in synchronizing the journal files with the object store. The data processing system can use multiple RFS systems that can be controlled by an administrative server such that if a first RFS system fails, a second RFS system can continue as an interface for the run-time environment to access the cloud object storage as if the cloud object storage has the functionality to perform POSIX operations. While POSIX operations are used as an example herein, other file operations for operating systems can be extended to cloud object storage by the RFS, similarly as previously described for POSIX operations, for application recoverability or one or more other example applications.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 1A-1B are each a block diagram illustrating a system.

FIG. 8 is a flow diagram.

DETAILED DESCRIPTION

Figure 1A:
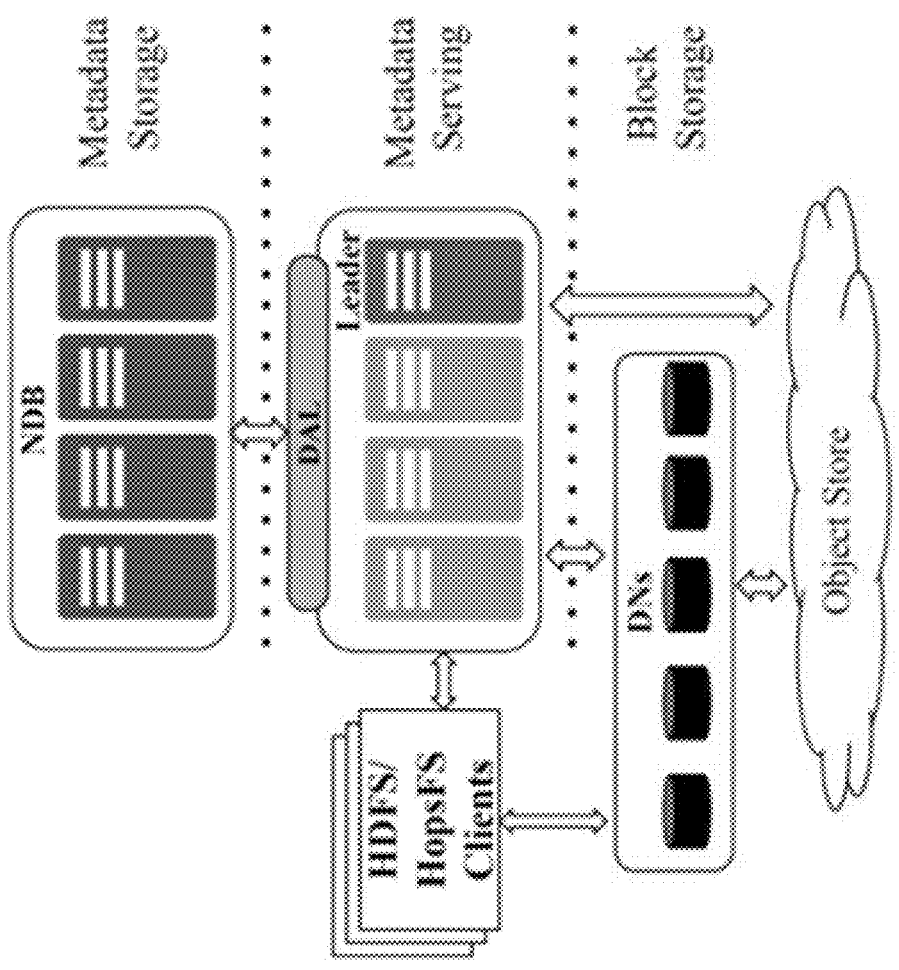
Figure 1C:
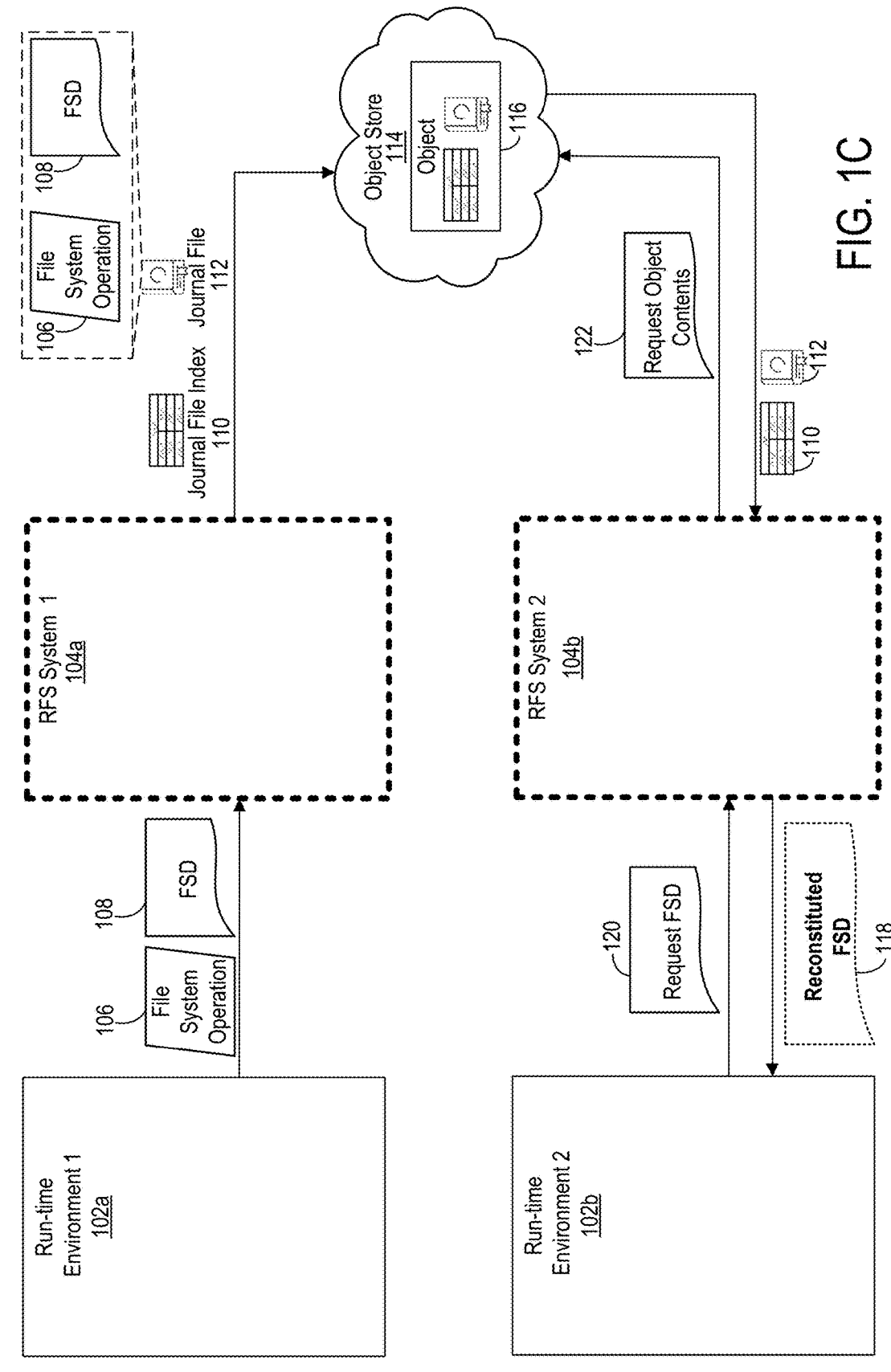
FIGS. 1C-1E are each block diagrams illustrating an RFS system.
Figure 1D:
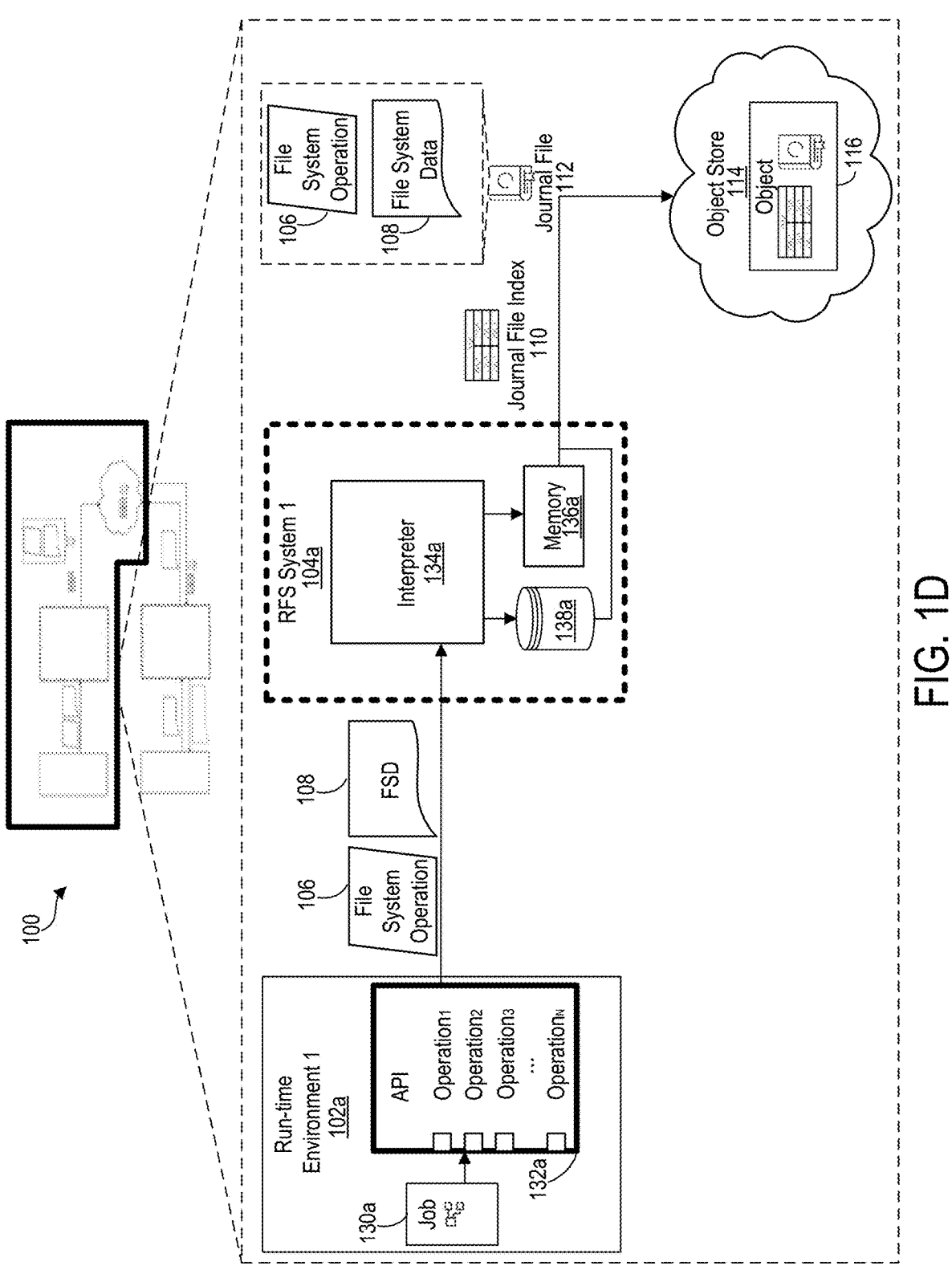
Figure 1E:
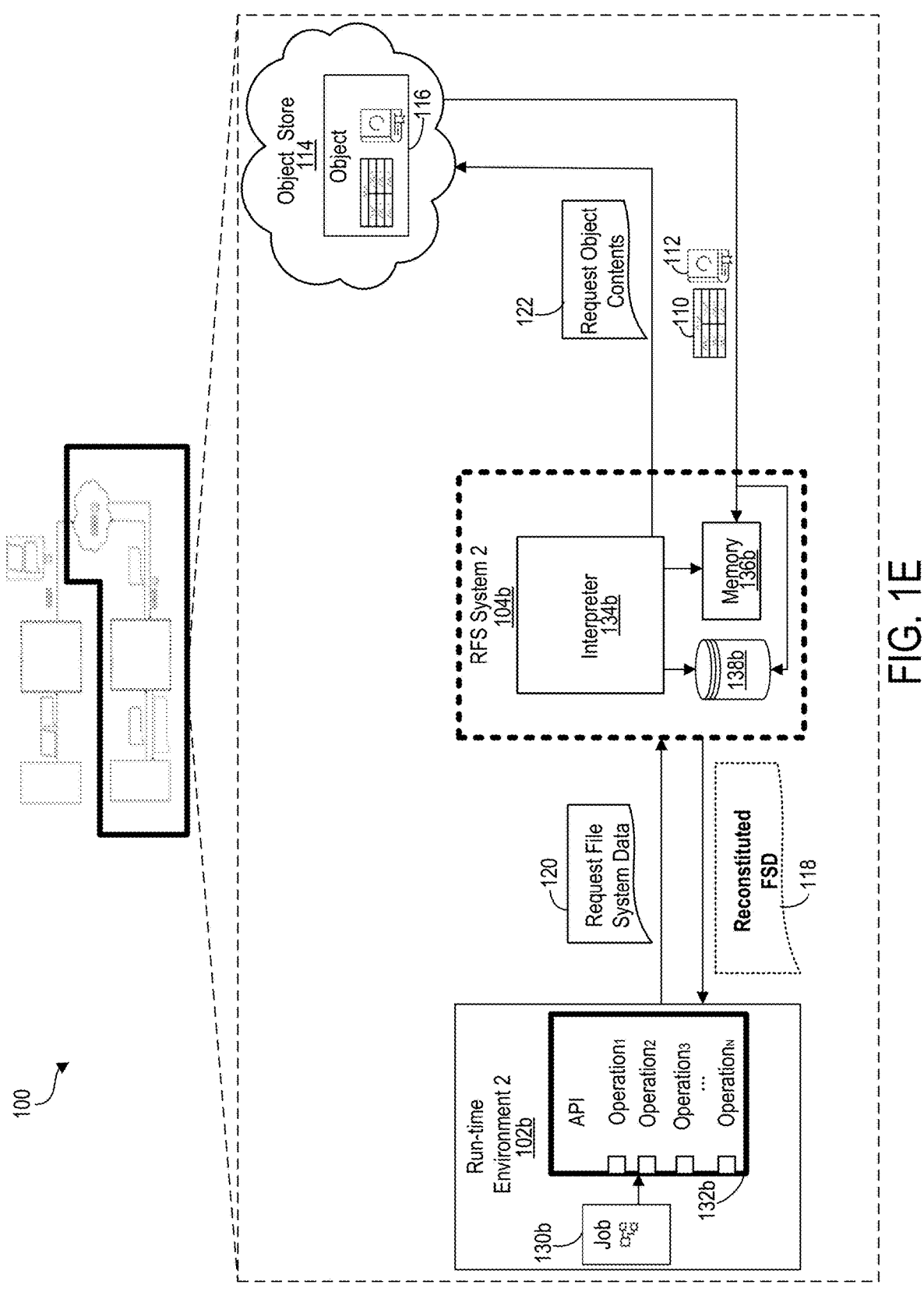

FIGS. 1C-1E are each block diagrams illustrating a remote file service (RFS) system 100. The system 100 includes a run-time environment 102a, a first RFS system 104a, a second run-time environment 102b, a second RFS system 104b, and an object store 114. The run-time environments 102a-b each include computing systems such as data processing systems that are configured to run applications. The applications can each include one or more jobs that are configured to perform respective tasks. For example, the jobs can be configured to process data records in batch, in real-time, as a stream, and so forth. RFS systems described herein can also be called file service interfaces or file service systems.

The applications executed by the run-time environments 102a-b are configured to store recoverability data, such as checkpoint files. When a processing workflow of a job fails or is interrupted, such as due to file corruption, loss of a network connection, memory failure, or other fault, the job can restart from a checkpoint to recover the processing workflow that failed and resume processing without requiring the application to restart the processing workflow from an initial state. A checkpoint refers to stored application data (e.g., application files) representing a state of the application during a processing workflow that includes all data for resuming the application processing from that state. This can include intermediate data of calculations, temporary metadata files, and so forth.

To store the recoverability data, a processor of the run-time environment 102a is configured to perform file system operations 106 on a recovery directory. File system data 108 can be represented in the recovery directory. Instructions to perform the file system operations are sent from the run-time environment 102a to the RFS system 104a. The RFS system 104a is configured to represent the location of the directory including the recoverability data 108.

As previously described, the run-time environment 102a is configured to store recoverability data in a cloud object store 114. The cloud object store 114 is preferred by the run-time environment 102a because the object store is more reliable and more redundant in storage than local storage of the run-time environment 102a. However, the file system operations 106 cannot be performed in the cloud object store 114 because the cloud object store either does not support the file system operations 106 or is not optimized to perform the file system operations. For example, the file system operations can include POSIX type operations for changing the structure of the recoverability directory storing the recovery data.

The RFS systems 104a-b function as interfaces between the run-time environments 102a-b and the object store 114. In other words, from the perspective of the run-time environments 102, the recoverability data are stored in the object store 114 representing cloud object storage. However, the RFS systems 104 store the recoverability data as logical data (logical files) representing the recoverability data 108 and are configured to interact with the cloud object store by journaling the operations in local files and sending a journal file 112 and a journal file index 110 for storage in the cloud object store.

The cloud object store can store the journal file 112 and the journal file index 110 using objects 116 of the object storage. During execution of operations in the run-time environments 102, the structure of the application data (e.g., directory structure of files) is maintained at the RFS systems 104 using the journal file 112 and its associated index 110. This structure is recorded and sent to the object storage. When the run-time environments 102 need to recover data, a request is sent to the RFS systems 104 that is initialized. The RFS system 102b, when it is initialized, requests 122 any recoverability data from the object store 114 and has this recoverability data 120 available to any associated run-time environment 102b. The recoverability data 120 is stored as a logical file that can be reconstituted into instructions or operations 118 to be performed by the run-time environment 102b. The RFS system 104b can generate the instructions for reconstituted file system data 118 using the journal file 112 and index 110 retrieved from the object store 114.

FIG. 1D shows a data processing system 100 configured to store a representation of application data in cloud object storage 114. The run-time environment 102a hosts a job 130a that is executing in the run-time environment. The job 130a is configured to send instructions to an interface 132a, such as an application programming interface (API). The API 132a is configured to understand instructions for a list of operations 1 . . . n for changing data stored in the application data such as at the RFS system 104a. When an operation is performed, an instruction representing the file system operation 106 is sent to the RFS system 104a along with a representation of the file system data 108.

The RFS system 104a includes an interpreter 134a, a data store 138a, and a memory 136a. The interpreter 134a is configured to receive instructions through the API 132a and generate journal files 112 and index files 110. The interpreter 134 is configured to receive instructions to acquire recovery data from the object store 114 and determine which data should be retrieved from the object store that correspond to the appropriate run-time environment 102*a* with which the RFS system 104*a* is associated.

The RFS system 104*a* is configured to receive the instructions representing the operation 106 and the data 108 at the interpreter 134*a* generates a journal file 112 representing the file system data 108 and the file system operation 106 and an associated index 110 that specifies where in the journal file these data are represented. The RFS system 104*a* maintains a logical representation of the application file in which the structure of the file system data 108 are stored as the journal files 112. The RFS system 104*a* periodically sends these data to the object store 114, such as when a checkpoint of the recoverability data is being completed by the job 130*a*.

FIG. 1E shows a data processing system 100 configured to retrieve a representation of application data in cloud object storage 114 for recovering a job 130*b* that has failed or is restarting. The journal file 112 and the index 110 are requested in a request 122 sent from the RFS system 104*b* when the RFS system is initialized. The RFS system 104*b* is initialized as a backup to RFS system 104*a* or when RFS system 104*a* fails or goes offline.

A run-time environment 102*b* can be another instance of the run-time environment 102*a* such as for executing the same job in another instance or for replacing run-time environment 102*a* in case of hardware failure or responsive to hardware failure. The RFS system 104*b* includes the interpreter 134*b*, the data store 138*b*, and the memory 136*b* similar to the RFS 104*a*. The run-time environment 102*b* is configured to recover job 130*b* at a state in which job 130*a* failed. To recover a job 130, the run-time environment 102*b* is configured to request the file system data 120 from the RFS system 104*b* that has initialized with the respective recoverability data from the object store 114. The run-time environment can select the appropriate RFS system 104*b* using a directory tag as subsequently described. Generally, the RFS system 104*b* is initialized prior to a failure at the run-time environment 102*b* and is therefore ready to receive a request 120 for the application data or system data.

When the RFS system 104*b* receives the request 120, the RFS system sends instructions 118 for reconstituting the recoverability data to the run-time environment 102*b* through the API 132*b*. The job 130*b* can receive the instructions for reconstituting the application data (e.g., application files) and update local data (e.g., local files) to correspond to a state at which the previous job failed and resume execution.

Figure 2A:
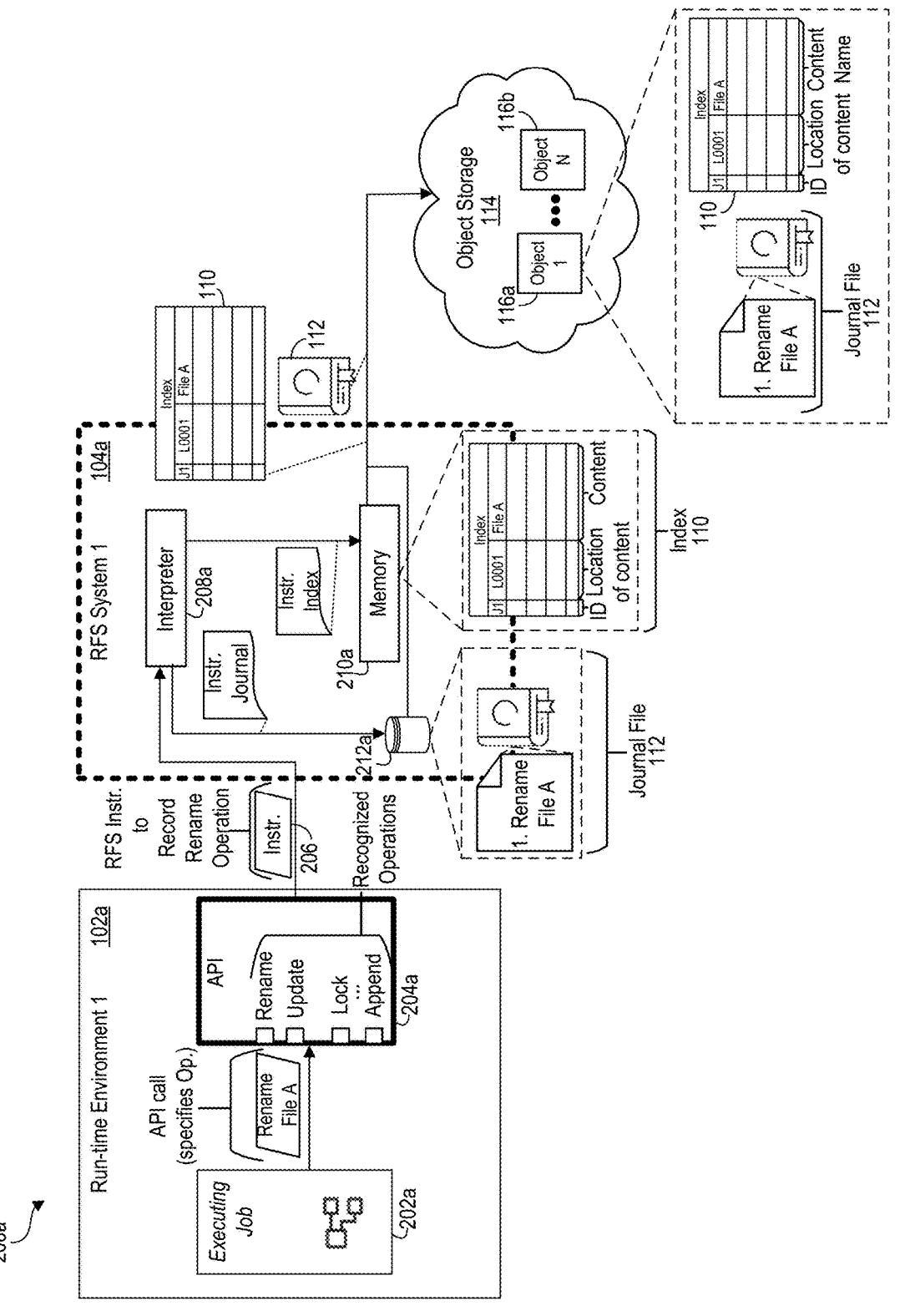
FIGS. 2A, 2B, and 2C each include a block diagram of an RFS system.
Figure 2B:
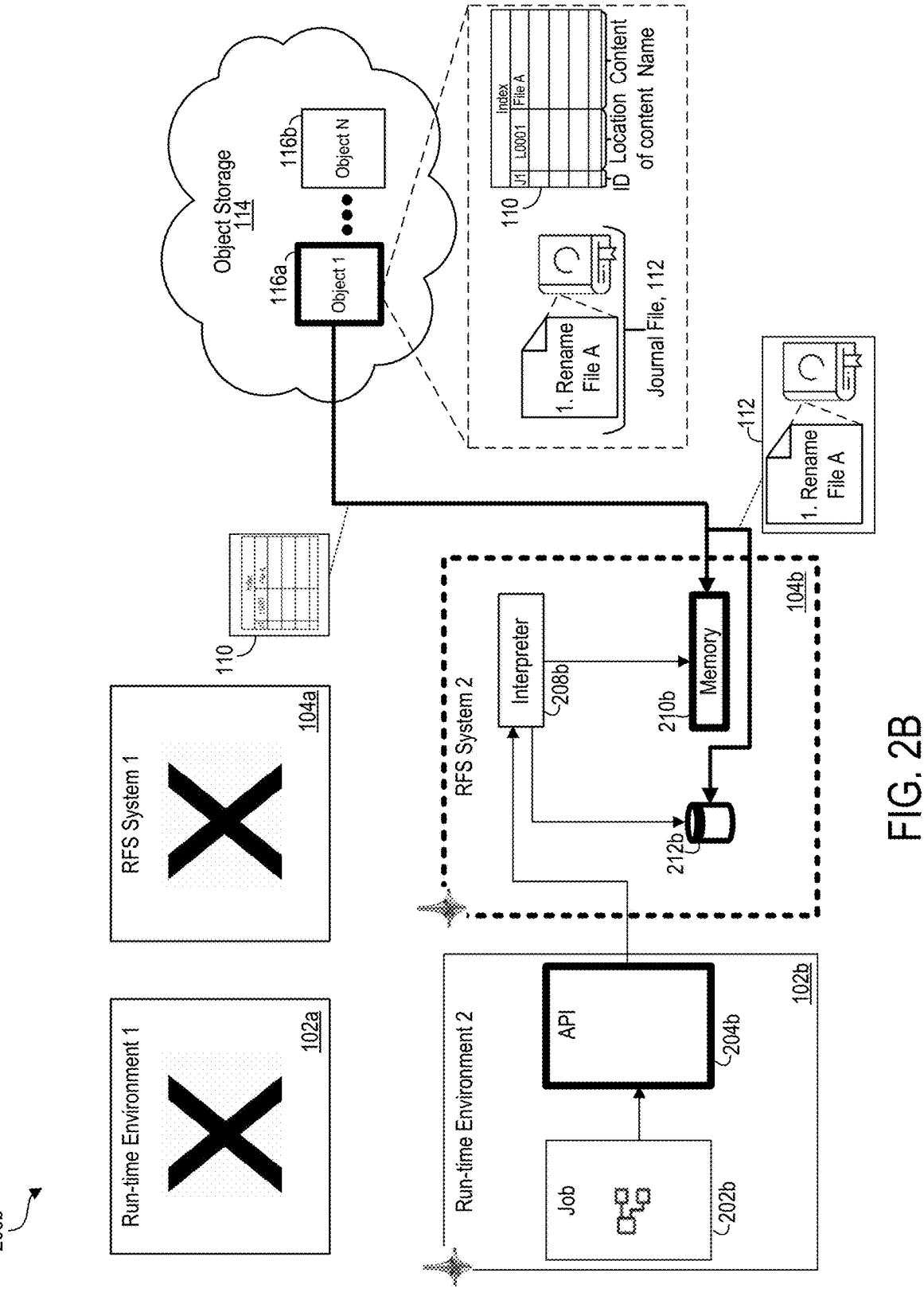
Figure 2C:
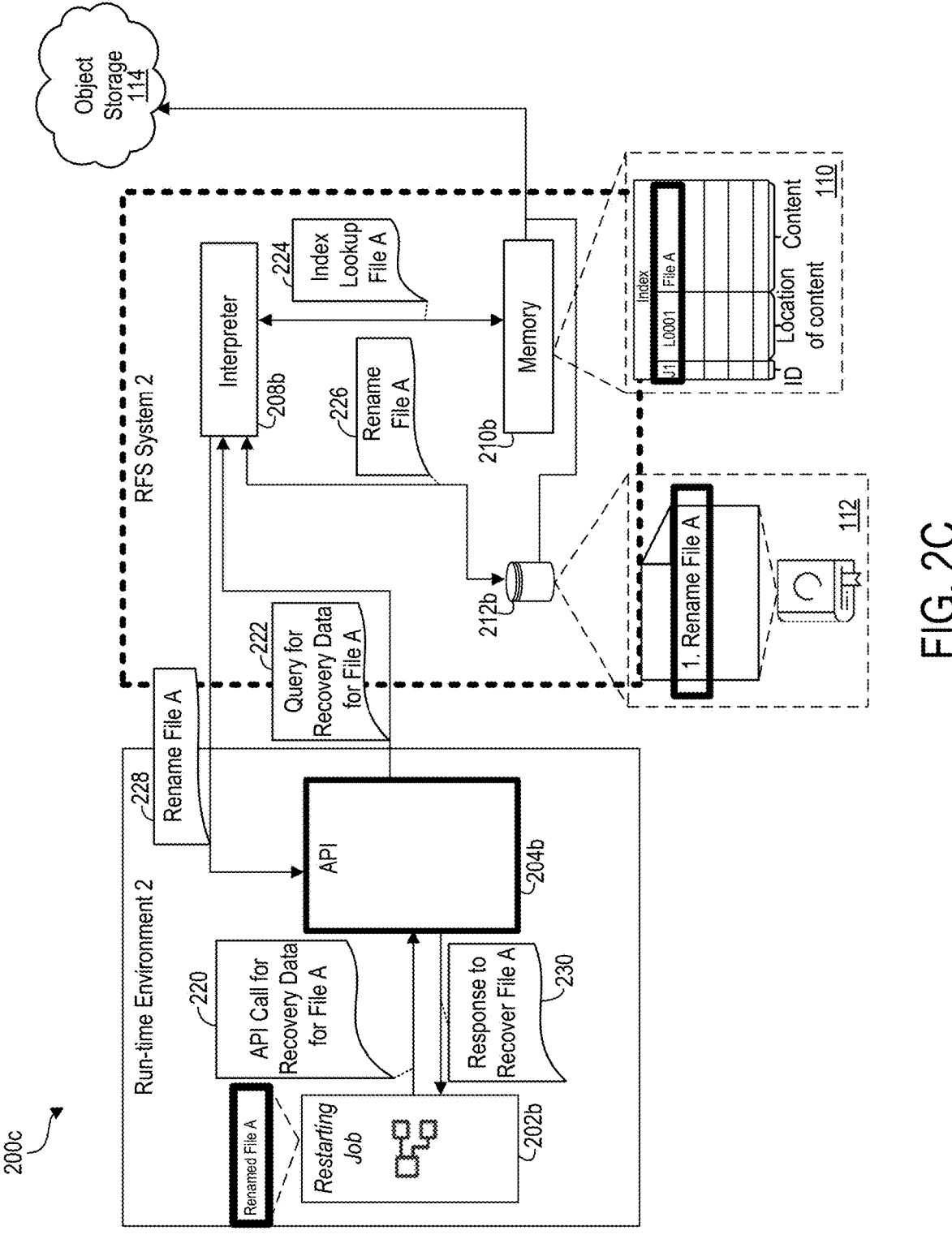

FIGS. 2A, 2B, and 2C each include a block diagram of an RFS system. In FIG. 2A, a system 200*a* is configured to store file operations in cloud object storage for recoverability of an executing job 202*a* in the run-time environment 102*a*. The run-time environment 102*a* includes an executing job 202*a* and an API 204*a*. The executing job 202*a* is configured to execute an application and generate application data, in some cases for recovering the job if the job fails. For example, these application data can include checkpoint data. As the job 202*a* executes, the job generates instructions for changing the structure of the application data. The job 202*a* sends an instruction such as "rename file A" to the API 204*a*. The API 204*a* is configured to know which RFS system 104*a* is associated with the particular job 202*a*. The API 204*a* has a set of recognized operations in which it can instruct the corresponding RFS system 104*a* to perform the operation on its logical representation of the directory, or the journal file 112 and index 110. The API outputs an instruction 206 and sends it to the interpreter 208*a* of the RFS system 104*a*. The interpreter 208*a* generates an instruction 209 to update the index 110 in memory 210*a*. The interpreter

208*a* generates an instruction 211 to update the journal file 112 in the data store 212*a*. Each of the journal file 112 and the index 110 are updated to record the operation "rename File A".

The journal file 112 includes the complete list of operations that have been performed on the logical structure of the directory, as received through the API 204*a* from the job 202*a*. Periodically, or response to another instruction received through the API 204*a*, the RFS system 104*a* is configured to send a copy of the journal file 112 and the index 110 to the object storage 114 for storage in one or more objects 116*a-b*. The object storage 114 can include cloud object storage (COS) that enables high redundancy of data storage and therefore high reliability of data storage for recoverability data and for the journal file 112 and the index 110.

The journal file 112 includes the list of operations performed by the job 202*a* while executing. The journal file 112 represents all of the operations performed on the structure of the application data such as renaming files or appending the files. The journal file can grow relatively large and can be stored on disk in most applications.

The index 110 includes a mapping between journal files 112 and corresponding files of the application files. For example, if a file (such as File A) is changed by an operation, the index specifies where in the journal those operations are for a given file. The index includes an identifier pointing to a specific journal file (J1), a location (such as location L0001, or line 1) in that journal file of the operations, and an identifier of the actual file itself (File A). The index 110 enables reconstitution of application data (e.g., a file structure of files) from the list of operations stored in the journal file 112. For example, if "File A" is to be reconstituted at the run-time environment 102*a* for job 202*a*, the API 204*a* can request all operations performed on "File A" from the interpreter 208*a*. As subsequently described, the interpreter accesses the index 110 retrieves the operations from the corresponding journal files 112 and sends the operations back to the run-time environment 102*a*.

FIG. 2B shows an example system 200*b* in which run-time environment 102*a* and RFS system 104*a* have failed. In this example, the run-time environment 102*a* and the RFS system 104*a* may have been disconnected from the network, experienced a power outage, or had some other failure in which the run-time environment 102*a* cannot operate further or the RFS system 104*a* cannot operate further or in a timely manner.

In this example, a new run-time environment 102*b* is instantiated (spun up) to resume execution of the job 202 (as job 202*b*). RFS system 104*b* is also instantiated, and includes instances of the interpreter 208*b*, data store 212*b*, and memory 210*b* as previously described. Upon instantiation, the RFS system 104*b* receives an instruction as to which application data are to be stored as logical files (e.g., journal files) within data store 212*b*. The instruction can be received from the run-time environment 102*b* or some other source. The RFS system 104*b* receives the journal file 112 and index 110 specifying the set of operations performed on the application data, including "File A".

FIG. 2C shows an example system 200*c* state (continuing from systems 200*a* and 200*b*) in which application data are reconstituted at the restarting job 202*b* using the journal file 112 and the index 110 of the RFS system 104*b*. The restarting job 202*b* requests, in an API call 220, recovery data for File A. The API 204*b* receives the instruction and sends a query 222 for the recovery data for File A. The query 222 is sent to the interpreter 208*b*. The interpreter 208*b* processes the query 222 and generates instructions 224, 226 to access the memory 210b to get the index 110 to find the location of file a in the journal file 112, and to access the data store 212b to access that portion of the journal file to recover the set of operations that were performed on File A prior to failure of the job 202. In this example, the operation includes "Rename File A". The set of operations 228 are acquired by the interpreter 208b are sent back to the API 204b as instructions 228 for changing application data (File A). The API 204b interprets the operations and generates instructions 230 for the job 202b to reconstitute the application file using the set of operations retrieved from the journal 112.

FIGS. 3A-3D are diagrams of the system of FIGS. 2A-2C in stages of storage of application data and recovery of application data from a cloud object storage using the RFS system 104b. The system 300 is similar to the system 200 described in relation to FIGS. 2A-2C, accept additional details are shown with respect to the processed data.

Figure 3A:
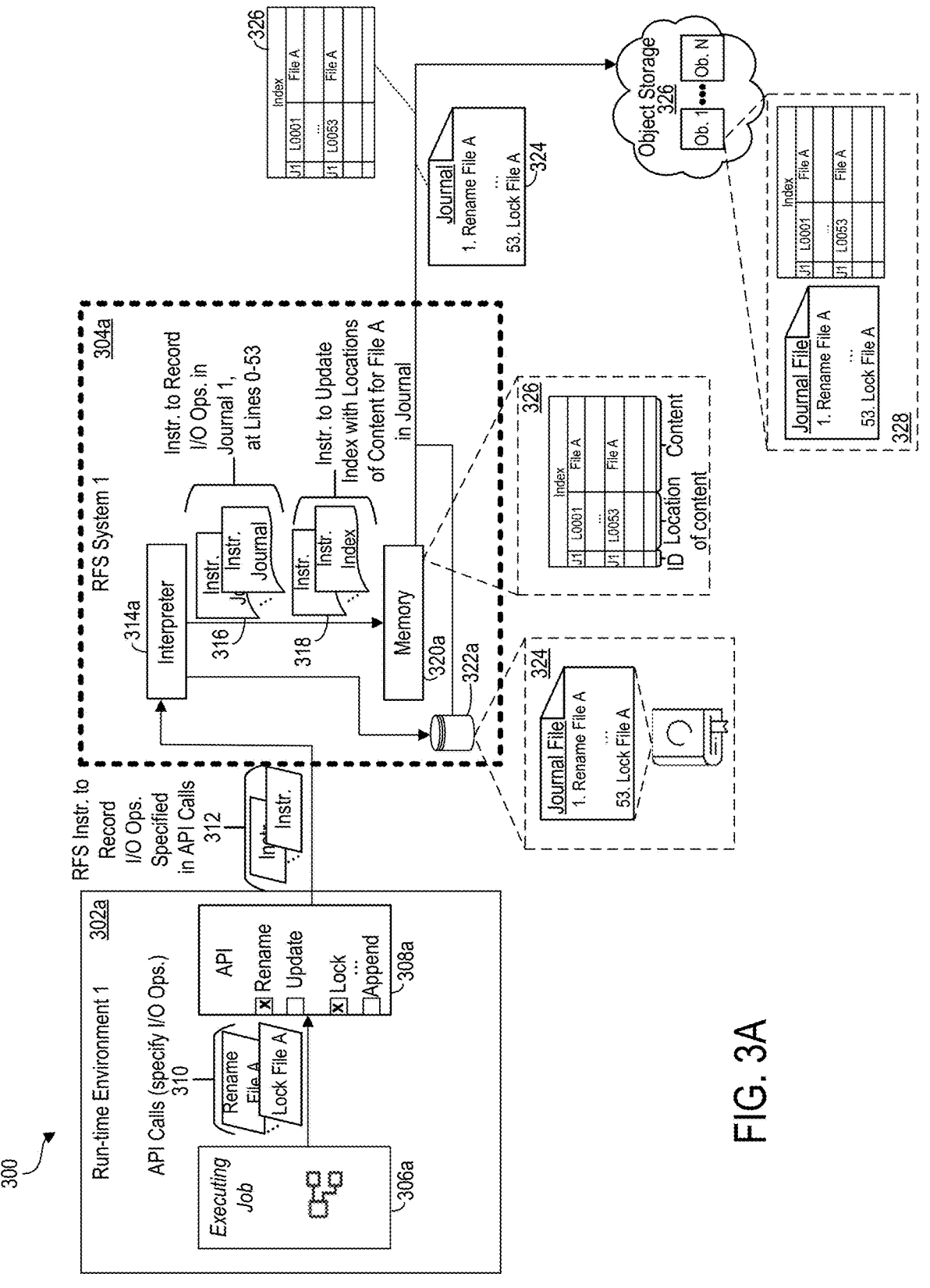
FIGS. 3A-3D are diagrams of the system of FIGS. 2A-2C in stages of storage of application files and recovery of application files from a cloud object storage using the RFS system.

FIG. 3A shows a system 300 including a run-time environment 302a and an RFS system 304a similar to those described previously. In this example, an executing job 306a sends API calls 310 to the API 308a. The API calls include file operations for "File A", such as RENAME, and LOCK. The API 308a generates instructions 312 representing the IO operations that were sent to the API. The instructions 312 are received by the interpreter 314a. The interpreter 314a generates instructions 316 for updating the journal file 324 and instructions 318 for updating the index 326. As previously discussed, a copy of the journal file 324 is sent to the object storage 330 for storage in object 328. Similarly, a copy of the index 326 is sent to the object storage 330 for storage in object 328. The index 326 can be stored in memory 320a and the journal file 324 can be stored in a data store 322a.

Figure 3B:
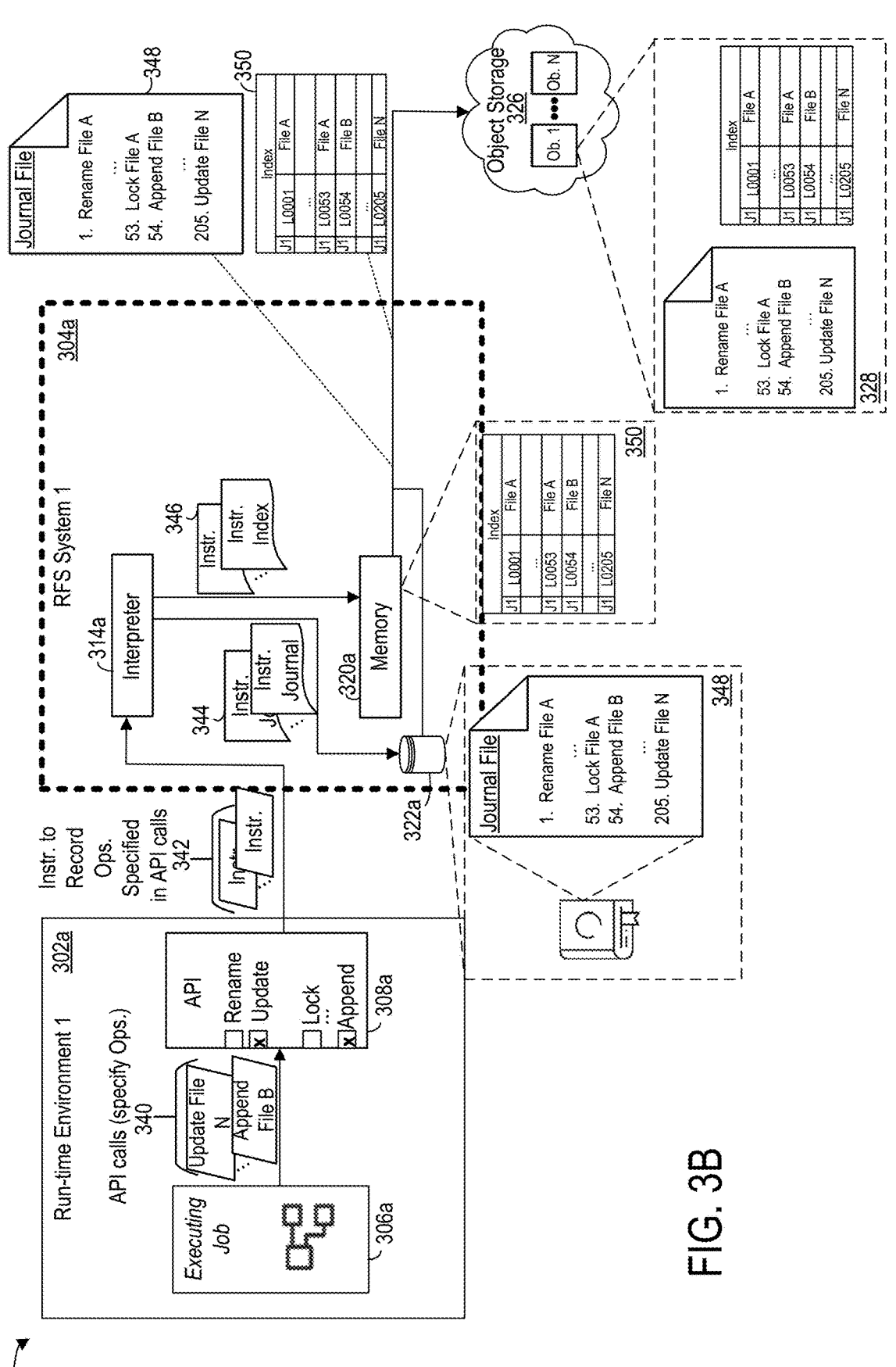
Figure 3C:
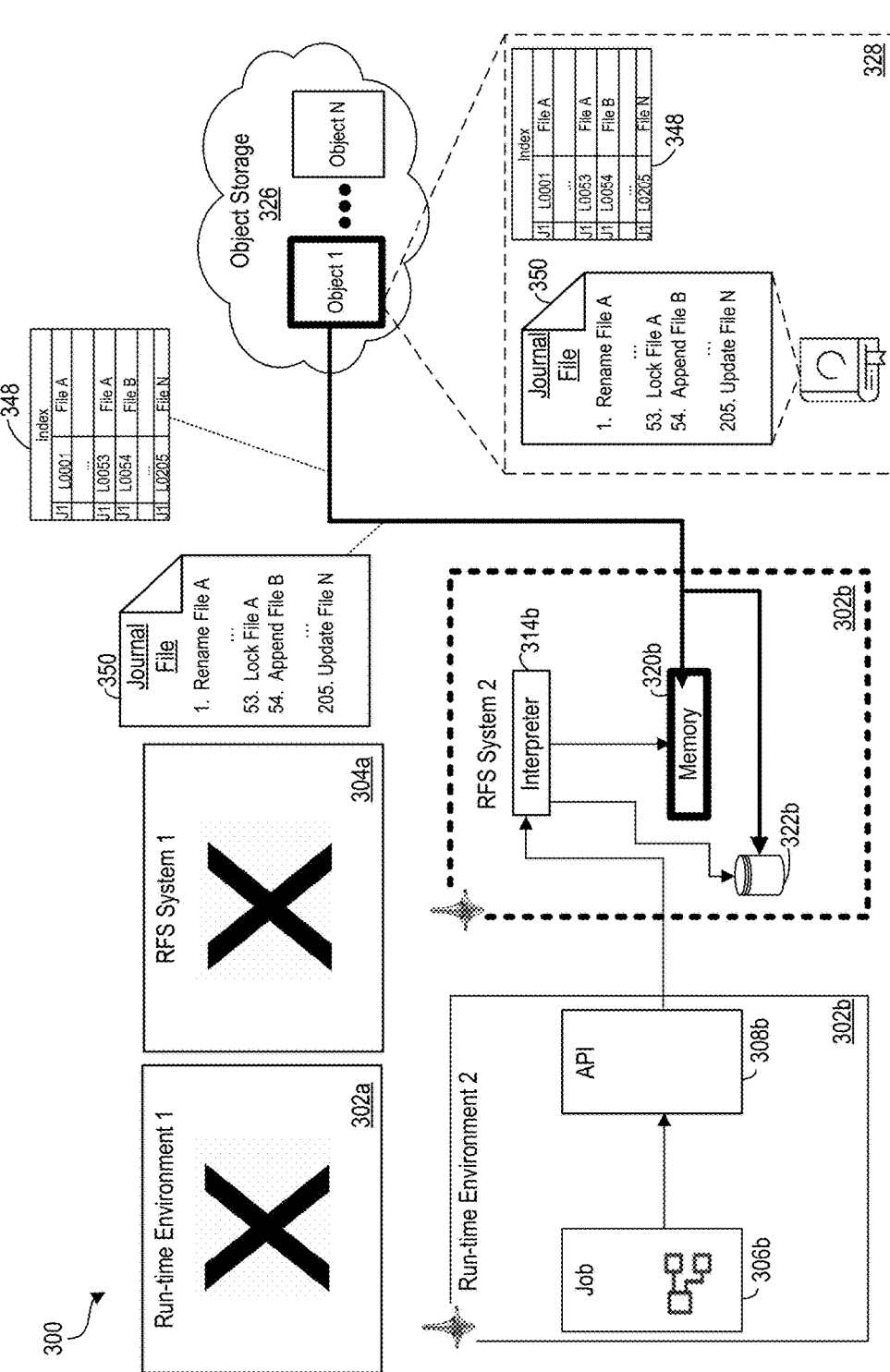
Figure 3D:
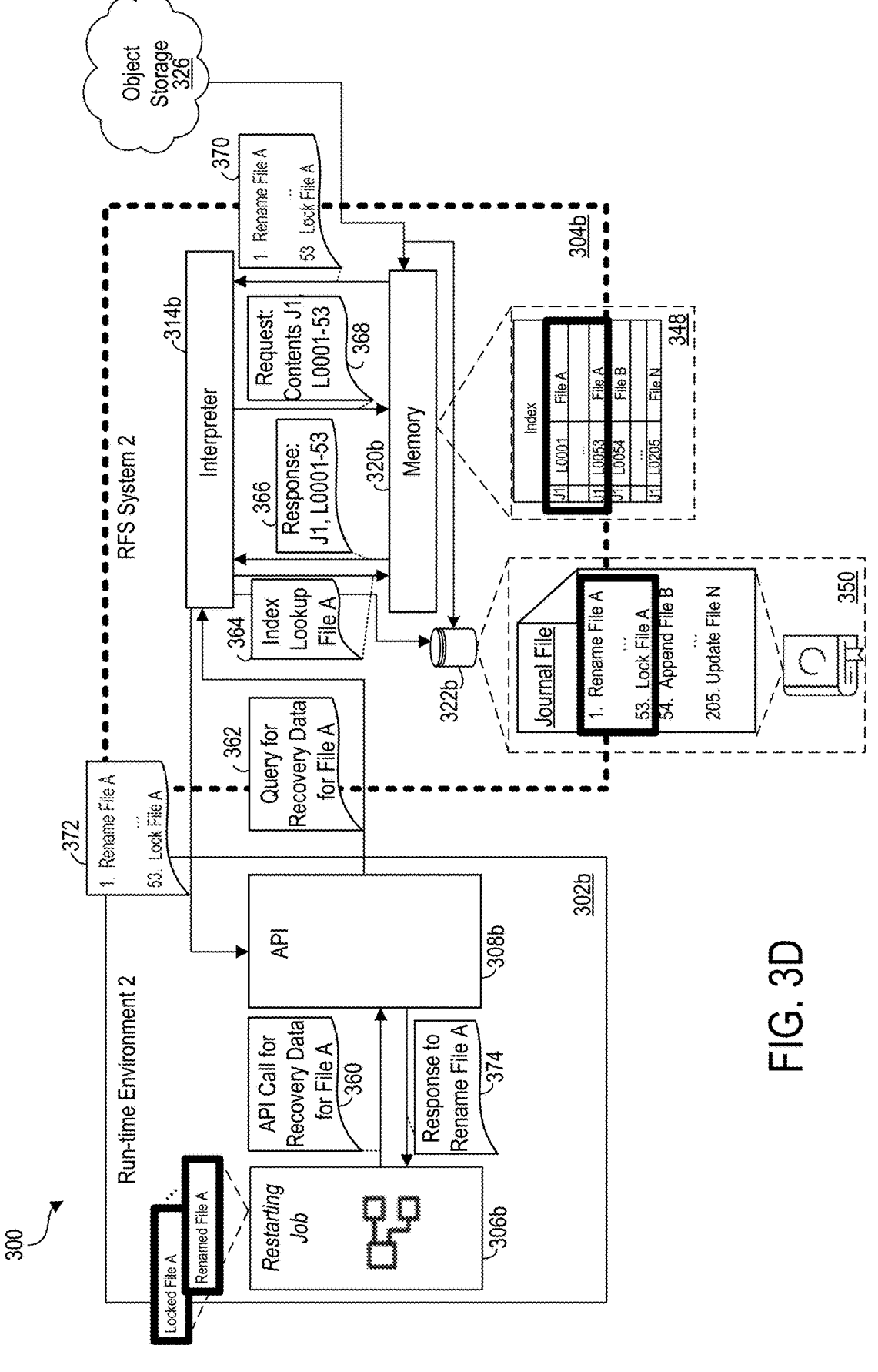

FIG. 3B shows system 300 when additional operations are performed by the job 306a. Additional operations instructions 340 are sent to the API 308a from the job 306a. The additional operations include updating File N and appending File B.

The API 308a generates instructions 342 with the additional operations and sends them to the interpreter 314a. The interpreter generates additional index instructions 346 and additional journal instructions 344 for updating the journal file 348 and the index 350 with additional data representing the additional operations. The updated journal file 348 includes additional locations L0053 . . . L0054 . . . up to L0205. These locations represent the additional operations performed for the application data including Files A, B, and N. the index 350 is correspondingly updated to represent the locations of these operations for the additional data, including File B and File N. As shown in index 350, File B has an operation that corresponds to line 54 of journal file 1, and File N has an operation corresponding to line 205 of journal file 1. As previously discussed, the updated index 350 and updated journal file 348 are sent to the object storage 330 for storing in a data object 328.

System 300 shows an example of run-time environment 302a and RFS system 304b failing, and the application job 306b restarting on new hardware of run-time environment 302b. As previously discussed, the RFS system 304b, when instantiated, can request the existing journal file 350 and index 348 from the object storage 330. The RFS system 304b includes a respective interpreter 314b, a memory 320b, and a data storage 322b, as previously discussed. The index 348 is stored in the memory 320b, and the journal file 350 is stored in the data storage 322b. The RFS system 304b is ready to receive requests for application data operations from the run-time environment 302b.

The run-time environment 302b is configured to recover the restarting job 306b. The job 306b generates an instruction 360 requesting recovery data for File A. In some examples, this request could also include data for File B and File N. The API 308b receives the request 360 and generates a query 362 for sending to the interpreter 314b to access the portion of the journal file 350 that includes operations corresponding to File A. To access the journal file 350 at the proper location, the interpreter 314b generates an instruction 364 to look up File A in the index 348. The interpreter 314 receives a response 366 from the memory 320b that specifies where in the journal file all of the operations corresponding to File A are included. In this example, the operations are in locations or addresses L0001 through L0053 in the journal file 350. The locations are sent in our response 366 to the interpreter 314b. The interpreter 314b sends a request to the data store 322b to access the portion of the journal file including locations L0001 through L0053. The interpreter receives the portion 370 of the journal file 350 that has the set of operations for File A included in it. The interpreter 314b sends a set of instructions 372 that represents the set of operations on File A back to the API 308b. The API 308b sends a response 374 to the job that enables the job to execute the set of operations on the application data to restore the state of the job 306 to the state at which it had failed previously.

FIGS. 4A-4F are diagrams of a system 400 including an administrative RFS server 430 configured to enable instantiation of surrogate or duplicate RFS systems for a run-time environment. The system 400 is similar to the previously described systems 200 and 300. The system 400 includes an RFS administrative server 430 that receives instructions for instantiating RFS systems as described previously. The RFS administrative server 430 has an interpreter 432 configured to receive special instructions from the API 408 of the run-time environment 402. In an example, an executing job 406 may wish to store application data in a particular PCOS destination 434. The executing job 406 sends this location in an instruction 410 to the API 408. The instruction 410 specifies a directory tag 412 and an RFS administration tag 414 that routes the instruction 410 to the RFS administrative server 430. The API 408 receives the instruction 410 and generates instruction 422 requesting that the RFS administrative server 430 instantiate a new RFS system to which the run-time environment can send operations as described previously. The instruction 422 includes the directory tag 412 and the RFS tag 414.

The RFS administrative server 430 receives the instruction 422 at the interpreter 432. The RFS administrative server instantiates a second RFS system as shown in operation 424. The new RFS server to be instantiated will also interact with COS 434 similarly to RFS system 404 interacting with COS 434. In this example, there are two RFS systems interacting with the same cloud object storage and potentially for a same executing job. Multiple run-time environments can ensure that, if one job fails, other instances of the RFS server or job are prepared to complete execution of the application, the multiple run-time environments can also enable distributed processing for an application with common storage of the application data in cloud object storage 434.

The RFS synchronization server 470 is in communication with the RES administrative server 430 and the RFS system 404. The RFS synchronization server 470 is configured to coordinate operations of the RFS system 404 with one or more other RFS systems that receive operations from the run-time environment 402.

The synchronization server 470 is configured to determine that each RFS system has received the same set of instructions as the other RFS systems, even though the instructions are sent asynchronously to each of the RFS systems by the run-time environment 402. Once each RFS system instance has received the same set of instructions, the RFS synchronization server 470 determines that these RFS systems are synchronized.

Specifically, the RFS synchronization server is configured to ensure that each identified instance 471 of the RFS system 404 connected to the run-time environment 402 has received the same set of instructions sent from the run-time environment to each of the RFS systems. For example, instructions may take longer to be received by a first RFS system then a second RFS system, and for a short period of time the two RFS systems are not synchronized because they have received different sets of operations for storing in their respective journals. In an example, if the first RFS system were to fail during this period, and not all instructions have been received at the second RFS system, there is a mismatch between the operations sent by the run-time environment and the recovery data available at the remaining RFS system. At scale, with thousands of operations occurring by the run-time environment, some of these operations can be lost during transmission.

The RFS synchronization server 470 is configured to determine which of the instructions were not yet received by the remaining RFS system and cause the application executing in the run-time environment to rollback (recover) execution to a state at which each of the RFS systems was synchronized when an RFS system fails, and recoverability data are not available. The RFS synchronization server 470 can send an indication that the respective RFS systems are synchronized and therefore allow the application to continue execution in situations in which recoverability data are confirmed prior to continuing execution of the application, the RFS synchronization server 470 can therefore reduce the latency of execution of the application at the run-time environment because the run-time environment does not need to wait for application data to be committed to the cloud object storage (which can be a relatively long operation) prior to continuing execution of the application. As previously described, the RFS synchronization server 470 can also facilitate recovery when one of the RFS systems fails prior to synchronization being achieved by identifying which application files or application data were lost.

The RFS system 404 in this example has an interpreter 416, a memory 418, and a data store 420, as previously described with respect to previous RFS systems. The RFS system 404 is configured to store operations related to the executing job 406 as described previously so that the operations are stored in the cloud object storage 434 in the journal file 436 and the corresponding index 438.

Figure 4A:
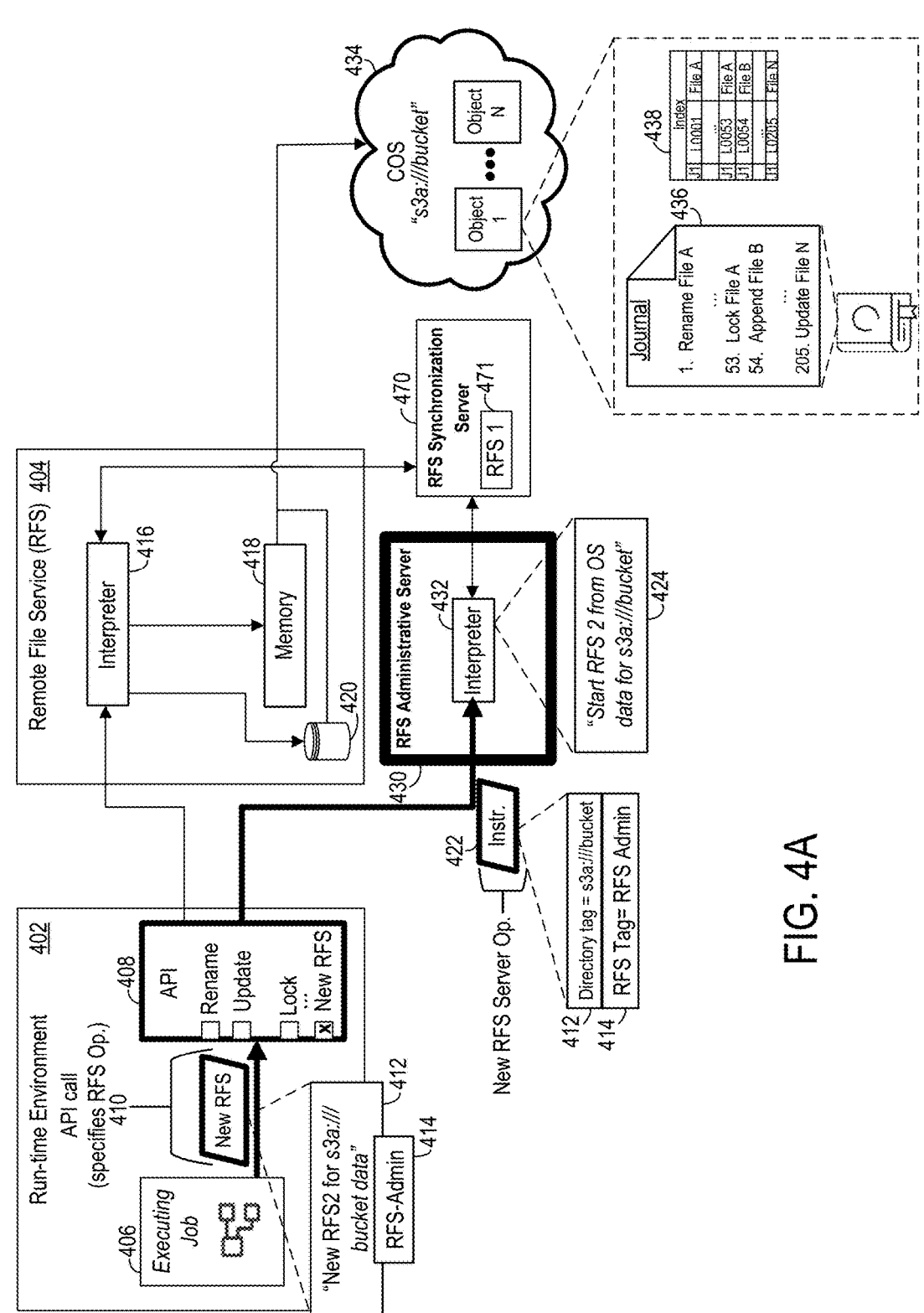
FIGS. 4A-4F are diagrams of the system of FIGS. 2A-2C including an administrative RFS system configured to enable instantiation of surrogate or duplicate RFS systems for a run-time environment and a synchronization system configured to control synchronization among RFS systems.
Figure 4B:
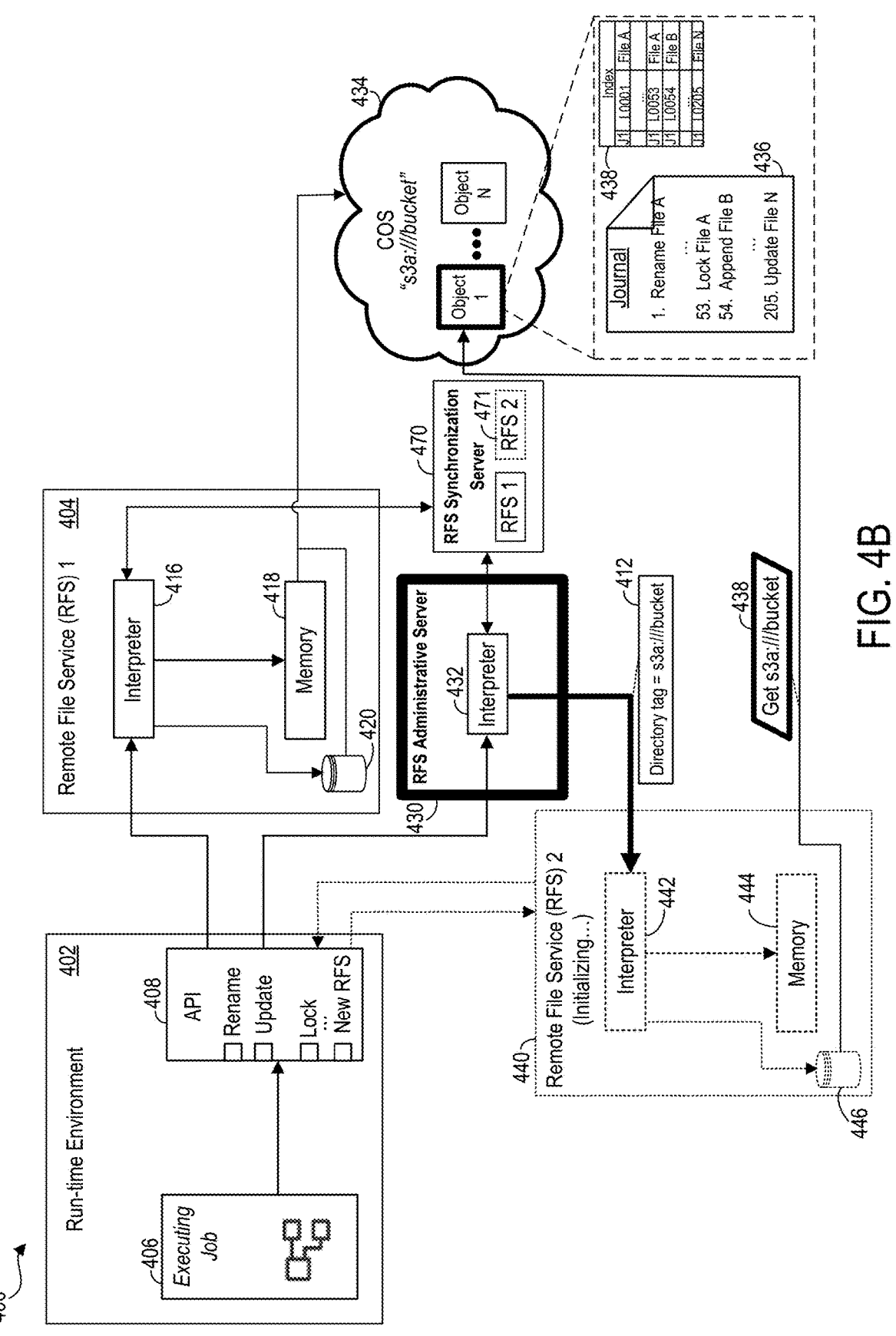

FIG. 4B shows the system 400 as a second instance of the remote file system 440 as instantiating or initializing. The RFS administrative server 430 sends, through the interpreter 432, a new target location 412 for the second instance of the RFS system 404. The directory tag 412 tells the RFS system 440 from which cloud object storage 434 the RFS system 440 is to retrieve the journal file 436 and the index file 438.

The interpreter 442 of the RFS server 440 sends an instruction 438 two the object represented in the directory tag 412 to access the journal file 436 and the index 438 for storing in the memory 444 and data store 446. Once the RFS system 440 receives the journal file 436 and the index 438, the RFS system is ready to cause a run-time environment to reconstitute an application if and when the executing job 406 fails. The RFS synchronization server 470 identifies the instance RFS2 473 that is initialized of the RFS system.

Figure 4C:
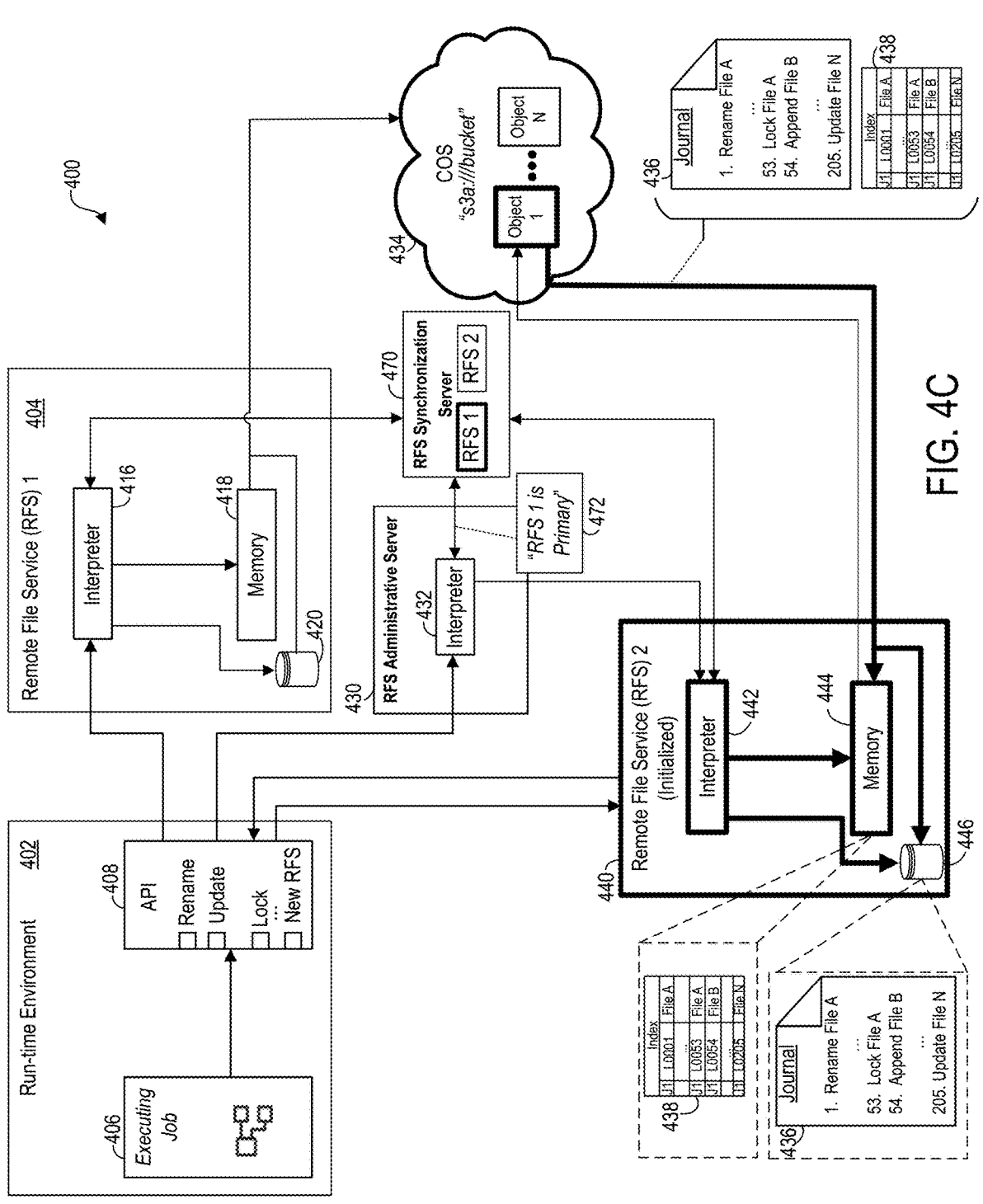

FIG. 4C shows the RFS system 440 after initialization has completed in which the index 438 is stored in the memory 444, and the journal file 436 is stored in the data store 446. Because the RFS system 440 is fully initialized, the RFS synchronization server 470 is instructed by the RFS administration server 430 that the RFS system 404 is the primary RFS system, as shown in instruction 472. The RFS synchronization server 470 is therefore configured to check that each of the initialized RFS systems 404, 440, are synchronized prior to one or more of the RFS systems committing application data (e.g., journal files) to the cloud object storage 434. The run-time environment 402 can therefore send sets of instructions representing operations of the executing job 406 to both the RFS system 404 and the RFS system 440. In some implementations, only the primary RFS system 404 is configured to send journal files to the cloud object storage. In this example, the secondary RFS system 440 is redundant in case the RFS system 404 fails. This redundancy can reduce losses of application data transmitted between committing journal files (e.g., including checkpoint data) to the cloud object storage. In some implementations, the primary RFS system 404 and any secondary RFS systems, such as RFS system 440, are each configured to send journal files to the cloud object storage as the job 406 executes. For example, if RFS system 404 fails, RFS system 440 can continue operating without impacting application performance. Meanwhile, RFS system 404 can be restarted or replaced for reestablishing redundancy. If both RFS systems 404, 440 fail at the same time, the application data can be recovered from the cloud object storage 434.

Figure 4D:
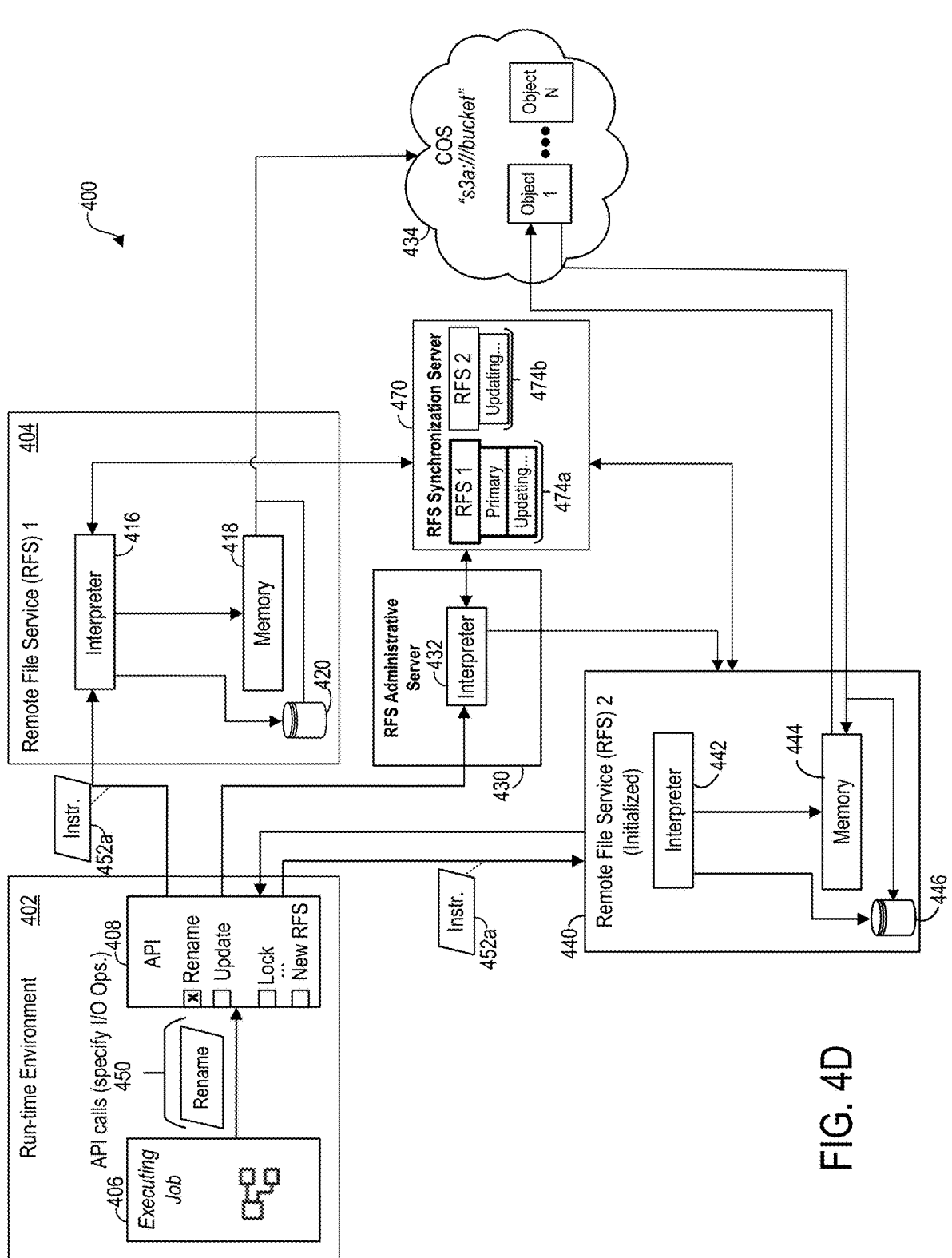

FIG. 4D shows an example of the data processing system 400 with multiple RFS systems for the executing job 406. Specifically, the job 406 is executing with RFS system 404 and RFS system 440 both initialized and generating logical files (journal files) of operations for the application data of job 406. The RFS synchronization server 470 ensures that the RFS system 404 is synchronized with the RFS system 440 such that the journal files in each RFS system are updated in the same way prior to receiving subsequent instructions from the run-time environment. The RFS synchronization server 470 performs a check for each initialized RFS system 404, 440 to ensure that the same instructions have been received by each system. Once this confirmation is completed, the RFS synchronization server instructs the RFS administrative server 430 that synchronization is completed, and the RFS administrative server 430 can instruct the job 406 to continue executing. In some implementations, the administrative server simply records the most recent state at which the instances of the RFS systems 404, 440 are synchronized. This can ensure that any "in flight" data that is lost when an instance of an RFS system fails is properly journaled by one or more other instances of the RFS system.

The RFS synchronization server 470 includes synchronization data 474a-b for each instance 404, 440 of the RFS system for the job 406. The primary instance of the RFS system 404 is tagged in the RFS synchronization server as shown in synchronization data 474a. The one or more secondary RFS system instances 440 are shown in other synchronization data, such as synchronization data 474b. When the respective instance of the RFS system is still updating, the synchronization data 474 show that the synchronization is not yet complete for that instance of the RFS system. For example, when instructions 452a-b, representing operation 450 for job 406, are received by the respective instances 404, 440 of the RFS system, the RFS synchronization server 470 shows in the synchronization data 474*a-b* that synchronization is not yet completed for any of the instances 404, 440.

Figure 4E:
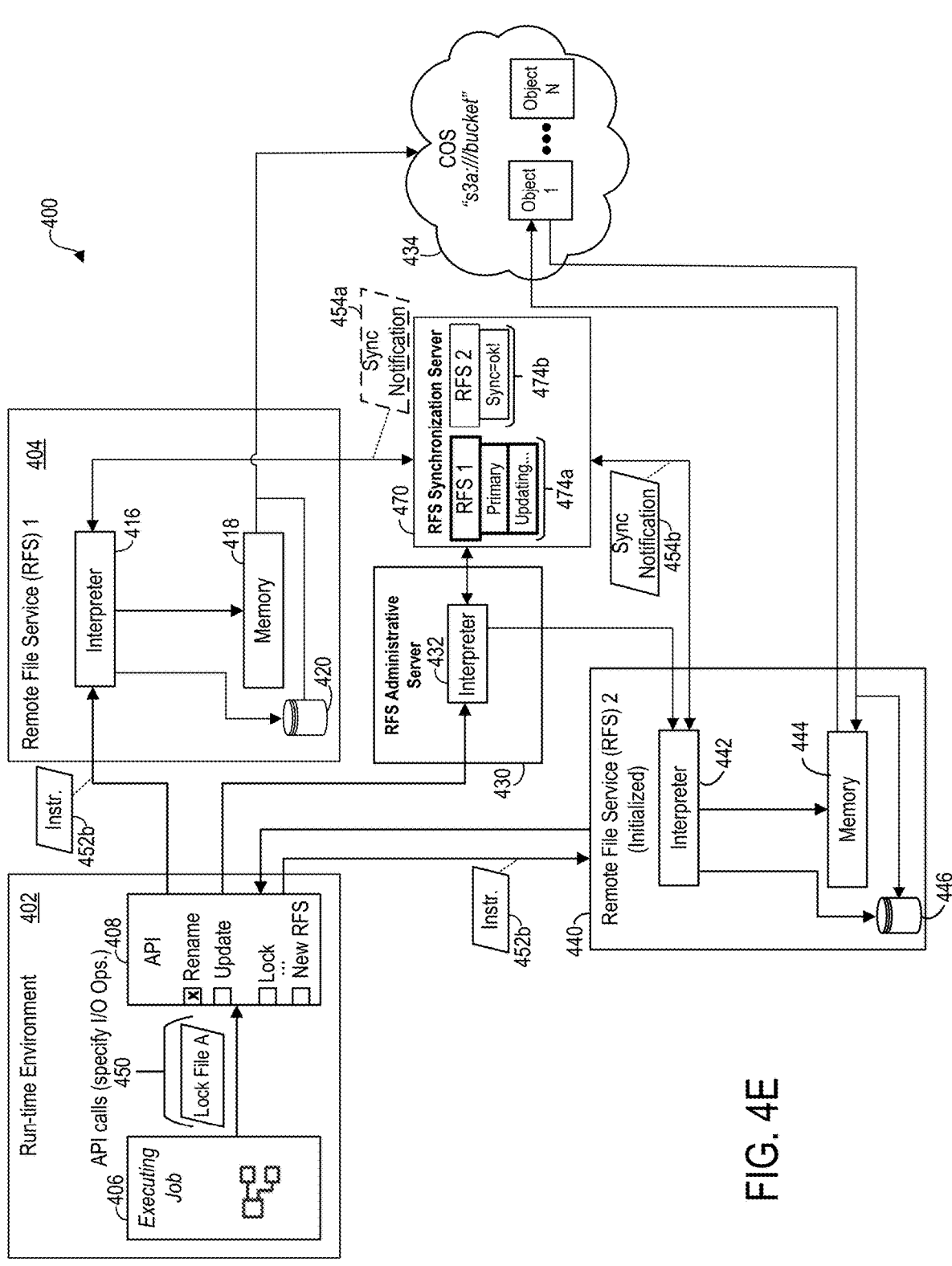

FIG. 4E shows the RFS synchronization server 470 communication with the one or more instances 404, 440 of the RFS system. Once all of the instructions 452 are received at an RFS system instance, that instance sends a sync notification 454 specifying all instructions that have been received have been recorded. In this example, the instruction 452*a* has not yet been successfully recorded by the RFS system 404, while the instruction 452*b* has already been successfully recorded by the RFS system 440. The RFS system 440 sends a sync notification 454*b* to the synchronization server 470. The RFS system 404 sends a sync notification 454*a* to the RFS synchronization server 470 that has not yet been received. The RFS synchronization server can determine which of the RFS systems 404, 440 have completed recording instructions and determine whether each of the RFS systems 404, 440 have recorded the same instructions as the other instances. In this example, RFS system 440 has completed recording and is ready to accept more instructions data 452, and the synchronization data 474*b* shows that the status is "Ok". The RFS synchronization server 470 is still waiting for confirmation from the RFS system 404. Once the sync notification 454*a* is received, the RFS synchronization server 470 can compare the notifications 474*a* and 474*b* and determine that the RFS systems 404, 440 are synchronized with identical journals. In some implementations, the sync notification 454*a-b* can represent a state of the journal for a respective RFS system 404, 440, such as being a hash identifier or other identifier of the content of the journal.

Figure 4F:
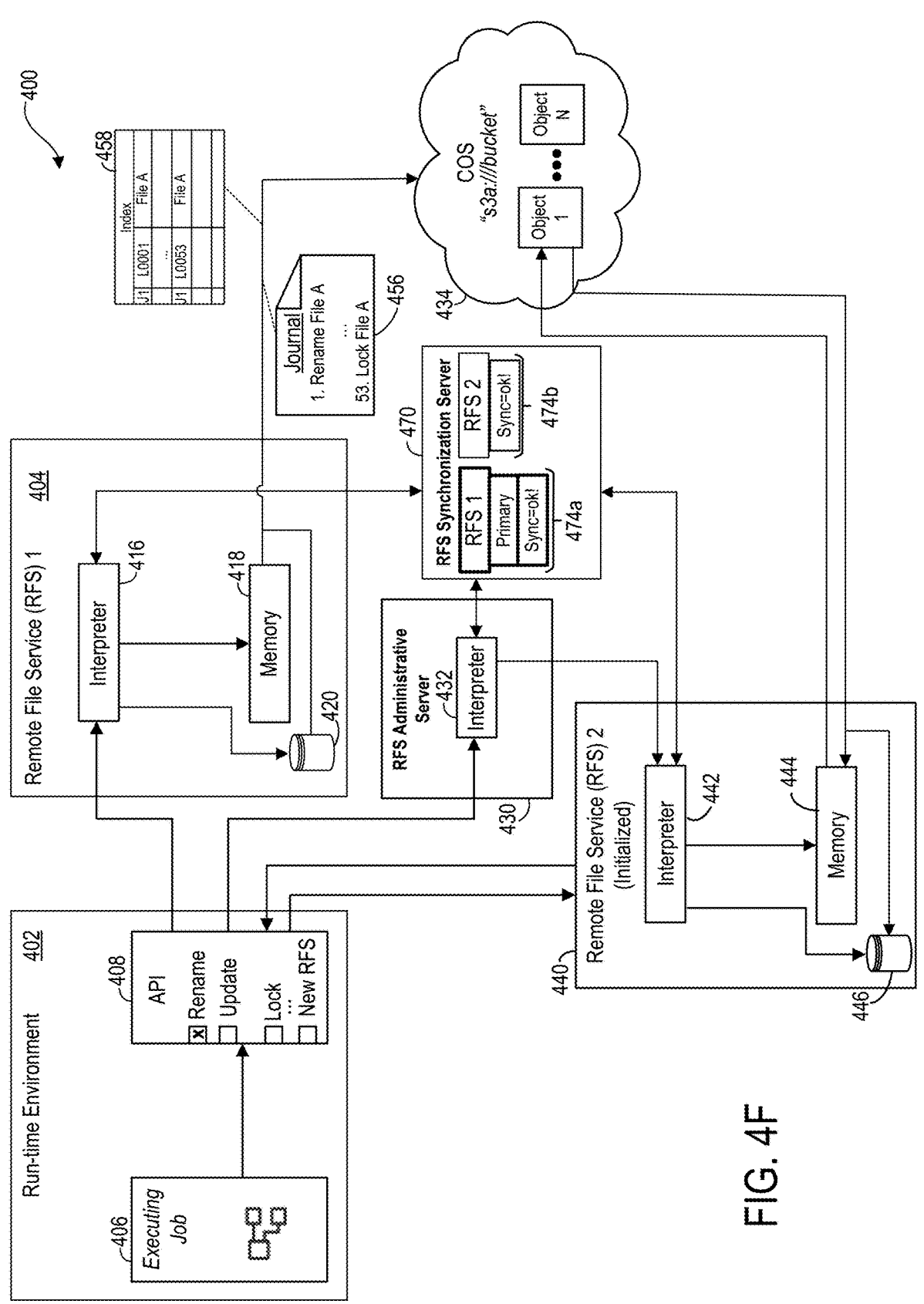

FIG. 4F shows the data processing system 400 in which both the RFS system 404 and the RFS system 440 have completed recording the instructions received for job 406. The contents of each journal are identical based on the sync notifications 454*a-b* received at the synchronization server 470, and so the synchronization data 474*a-b* for each instance of the RFS systems 404, 440 indicates that those instances are synchronized. The primary RFS system 404 sends commit data, such as the journal file 456 and its index 458, to the cloud object storage 434. Because the RFS systems 404, 440 are synchronized, the job 406 can continue executing without waiting for the journal file 456 and index 458 to complete being stored in the cloud object storage 434. This reduces a latency of using the cloud object storage 434 for storing the application data because the read/write times of the RFS systems 404, 440 are much shorter than the read/write time for the cloud object storage 434. For many (thousands, tens of thousands, millions) of instructions executed by the application (job 406), a substantial amount of processing time is saved.

Figure 5A:
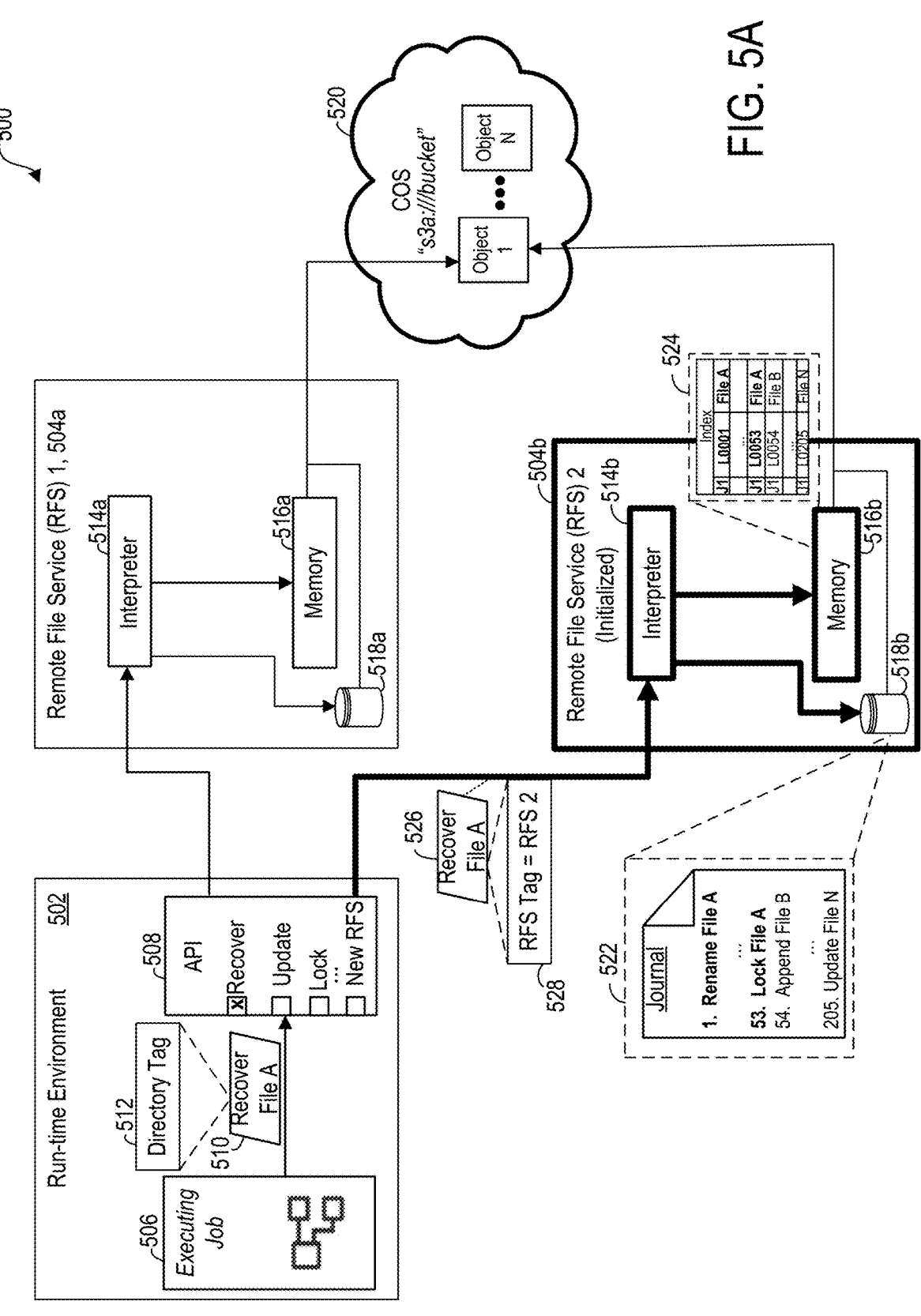
FIGS. 5A-5B are diagrams of the system of FIG. 4A-4C in which at least one RFS surrogate is used by the run-time environment for storing application files.
Figure 5B:
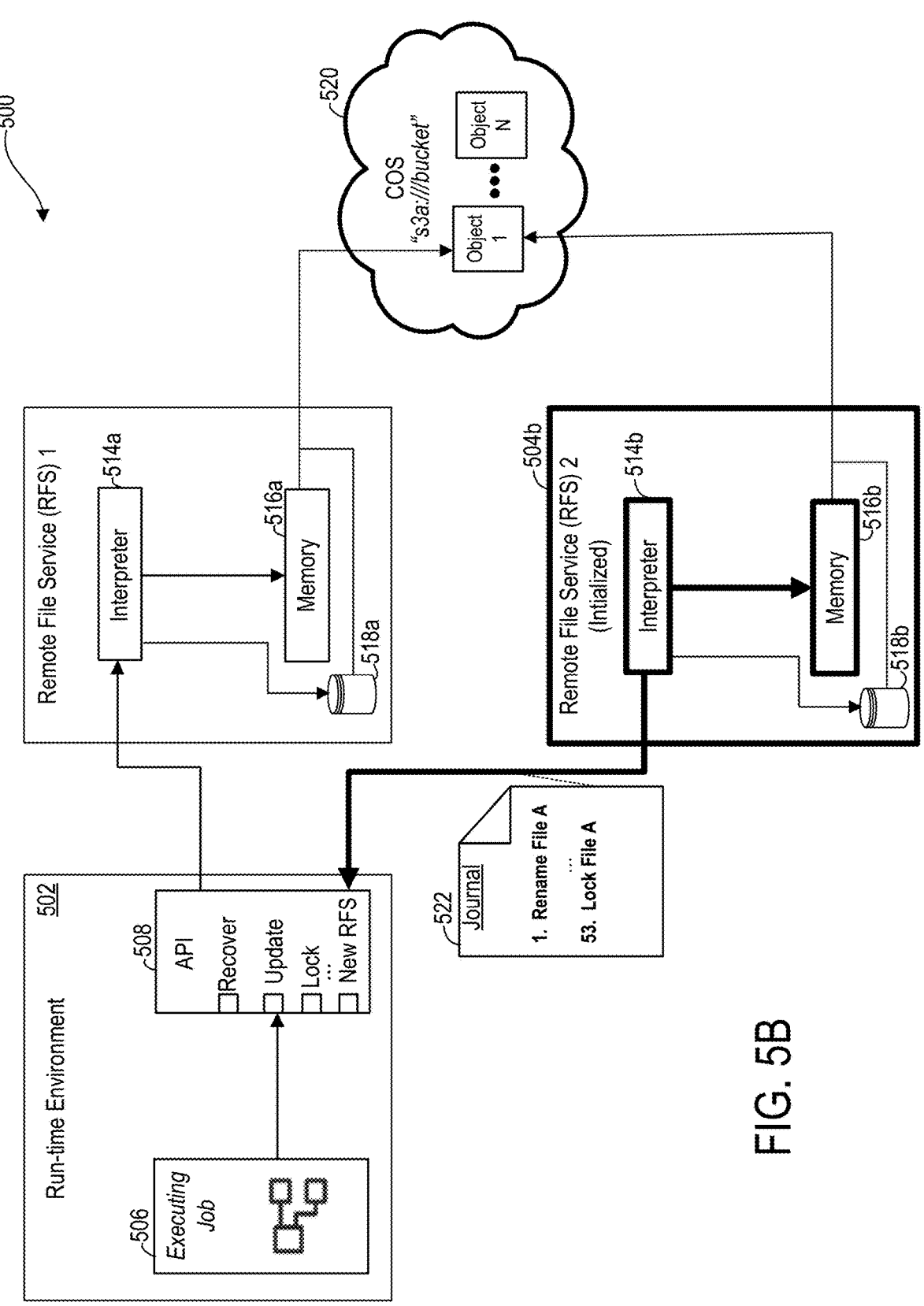

FIGS. 5A-5B are diagrams of the system 500 in which at least one RFS surrogate is used by the run-time environment for storing application data. The system 500 includes a run-time environment 502 and two RFS systems 504*a-b*. RFS system 504*a* is a primary RFS system including an interpreter 514*a*, a memory 516*a*, and a data store 518*a* for operating as described previously. RFS system 504*b* is a surrogate RFS system that is duplicative of RFS system 504*a*. RFS system 504*b* includes an interpreter 514*b*, a memory 516*b*, and a data store 518*b*. RFS system 504*b* is configured to store a same journal file 522 and index 524 as RFS system 504*a*. The RFS surrogate can enable the executing job 506 to be ready to recover at a moment's notice. The executing job 506 can select a particular RFS system 504*a-b* by sending a directory tag 512 along with an instruction 510, such as to recover a particular file (File A). The API 508 generates an instruction 528 for sending to the specified RFS system, in this case the surrogate RFS system 504*b*.

FIG. 5B shows system 500 in which the surrogate RFS system 504*b* responds to the request by sending operations instructions 525 from the journal 522 to the run-time environment 502. The run-time environment 502 can then reconstitute the application data, such as application files, from the set of instructions listed in the journal file 522. The executing job can therefore resume execution at the point at which the job had failed.

Figure 6:
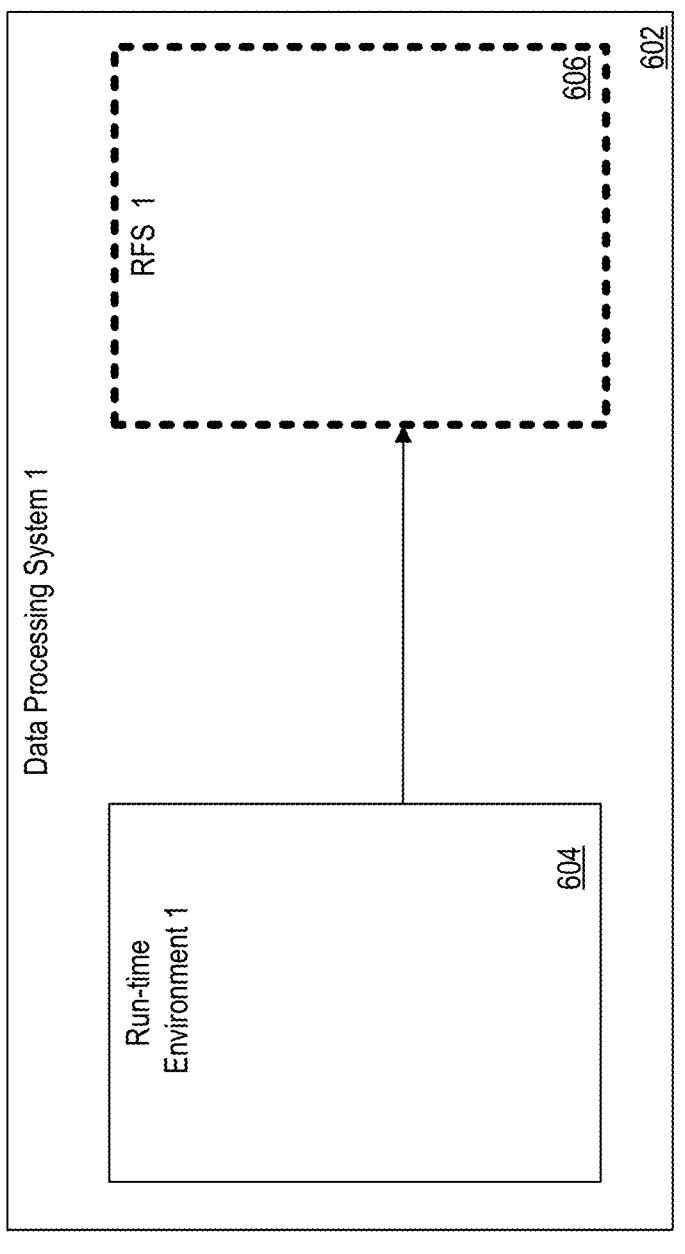
FIG. 6 is a data processing system.

FIG. 6 is a data processing system 600 that includes both the run-time environment 604 and the RFS system 606. In some examples, the run-time environment 604 is in a different location, such as at different hardware, than the RFS system 606. For example, the RFS system 606 can be a remote server and the run-time environment 604 can be at a client device. In other examples, the run-time environment 604 and the RFS system 606 are included in a same device such as a client device. In this example, a memory or a data store of the RFS system 606 and the run-time environment 604 may be the same. In this example, the data processing system 600 may fail in which both the run-time environment 604 and the RFS system 606 fail together. In this example, it is necessary to start up another instance of the RFS system 606 either on the same hardware or on different hardware for recovery.

FIGS. 7A-7E are diagrams of the system 700 of FIG. 2A-2C showing recovery of a failing job from cloud object storage. The system 700 is configured to recover and executing job 706*a* when the job fails to reconstitute data for a checkpoint such as checkpoint A. In this example, the storage and recovery of operations is performed as described previously but is specifically for reconstituting recoverability data.

The run-time environment 702*a* includes an executing job 706*a* and an API 708*a*. The executing job generates application data for performing the job such as checkpoint A recovery data 722. The recovery data 722 includes an application directory and various files such as recovery files "RecovFile1 . . . RecovFile53". Each of these files is named specifically for checkpoint A by including a name addendum "_CheckA" at the end of the file name. In an example, when a checkpoint is committed to the data store and a new checkpoint is started, each of these files is renamed from " . . . _CheckA" to " . . . _CheckB". The instructions 724 to rename these checkpoint files are sent to the API 708*a*. The API 708*a* generates instructions 726 to rename the files for checkpoint A and sends them to the interpreter 710*a* of the RFS system 704*a*. As described previously, the interpreter 710*a* generates instructions 728 for updating the journal and 726 for updating the index to record these name change operations in the logical file stored at the RFS system 704*a*. The journal file 718 records these name change operations and the corresponding index 720 is updated to represent where in the journal file these operations are recorded.

Figure 7A:
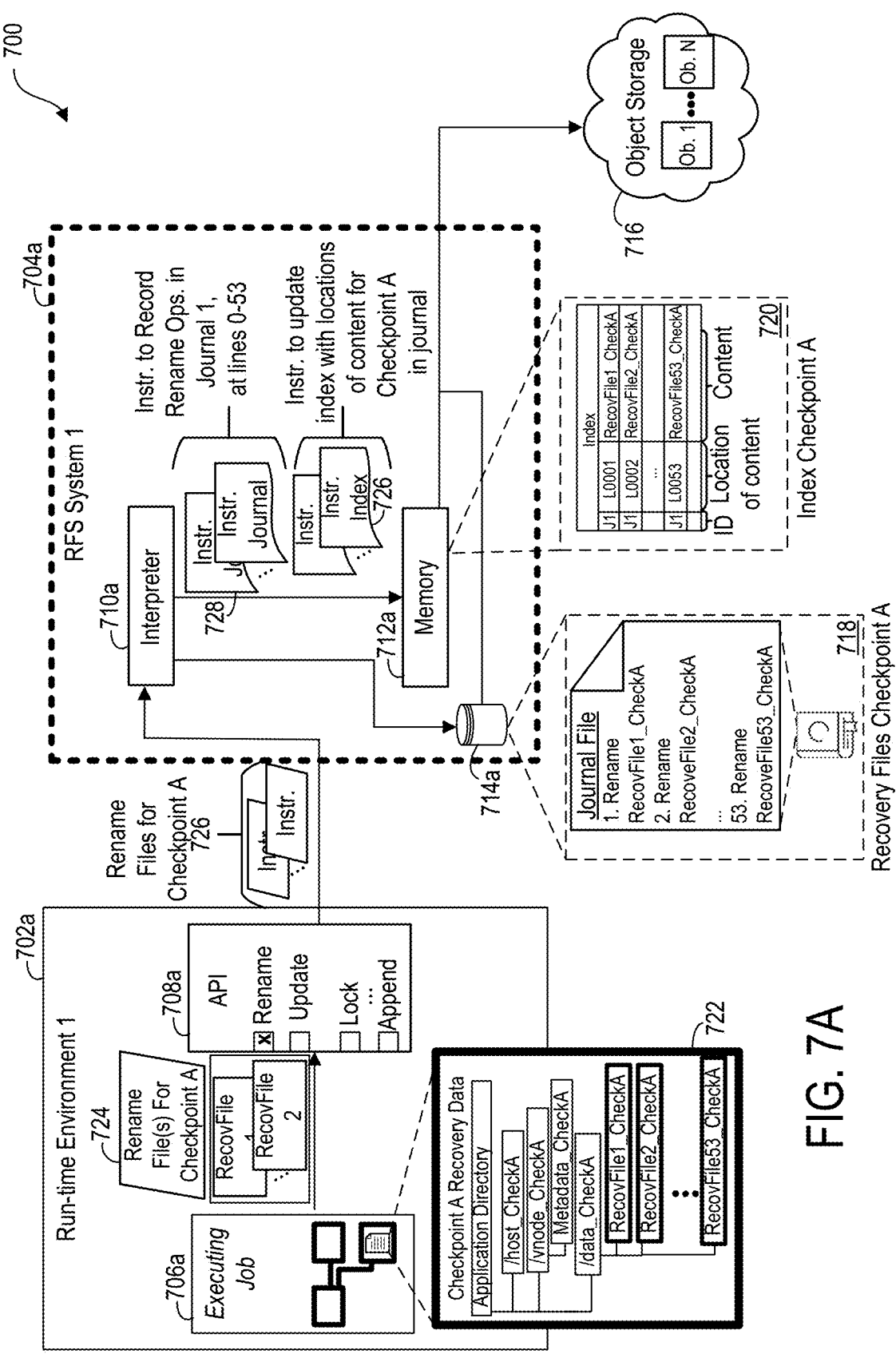
FIGS. 7A-7E are diagrams of the system of FIG. 2A-2C showing recovery of a failing job from cloud object storage.
Figure 7B:
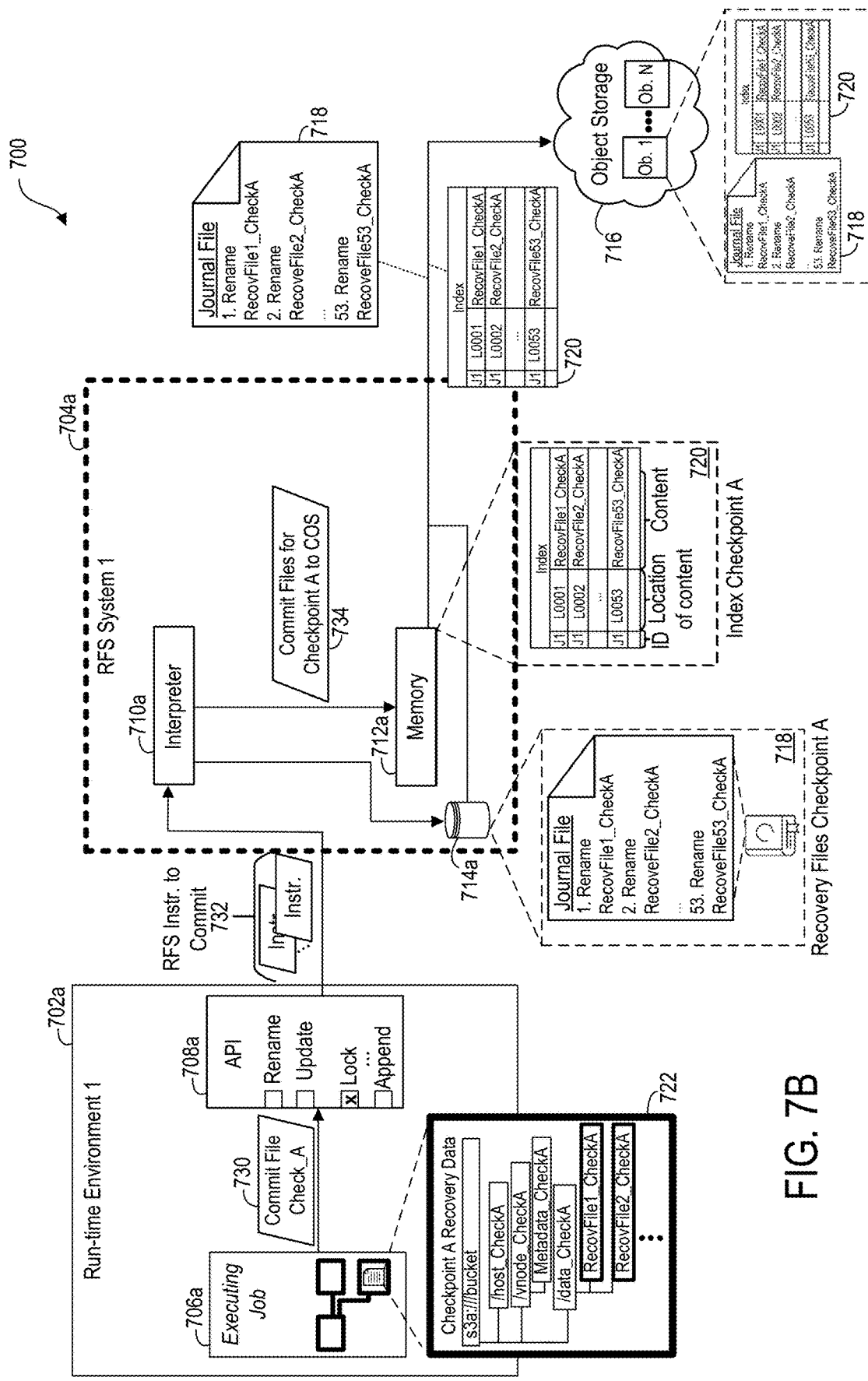

FIG. 7B shows the system 700 for committing the operations for checkpoint A to the object storage 716. When a checkpoint is complete and the operations are to be committed to the object storage 716, the data store 714*a* and the memory 712*a* send the journal file 718 and the corresponding index 720 data to the object store 716 for storage in an object. In some examples, the journal file 718 and the index 720 are saved to the object storage 716 based on another point in time of the processing. The RFS system 704 periodically commits the data to the object storage 716 in a way that is practical for any respective executing job 706*a*.

In this case, because checkpoints are committed at intervals, the RFS system can use those intervals for committing data to the object storage 716. However, any time period can be used for committing the journal file 718 and index 720 to the object storage 716. The time period can be regular or irregular, automatic, based on an instruction from the job, synchronized or asynchronous with particular data processing operations, or other similar configurations.

Figure 7C:
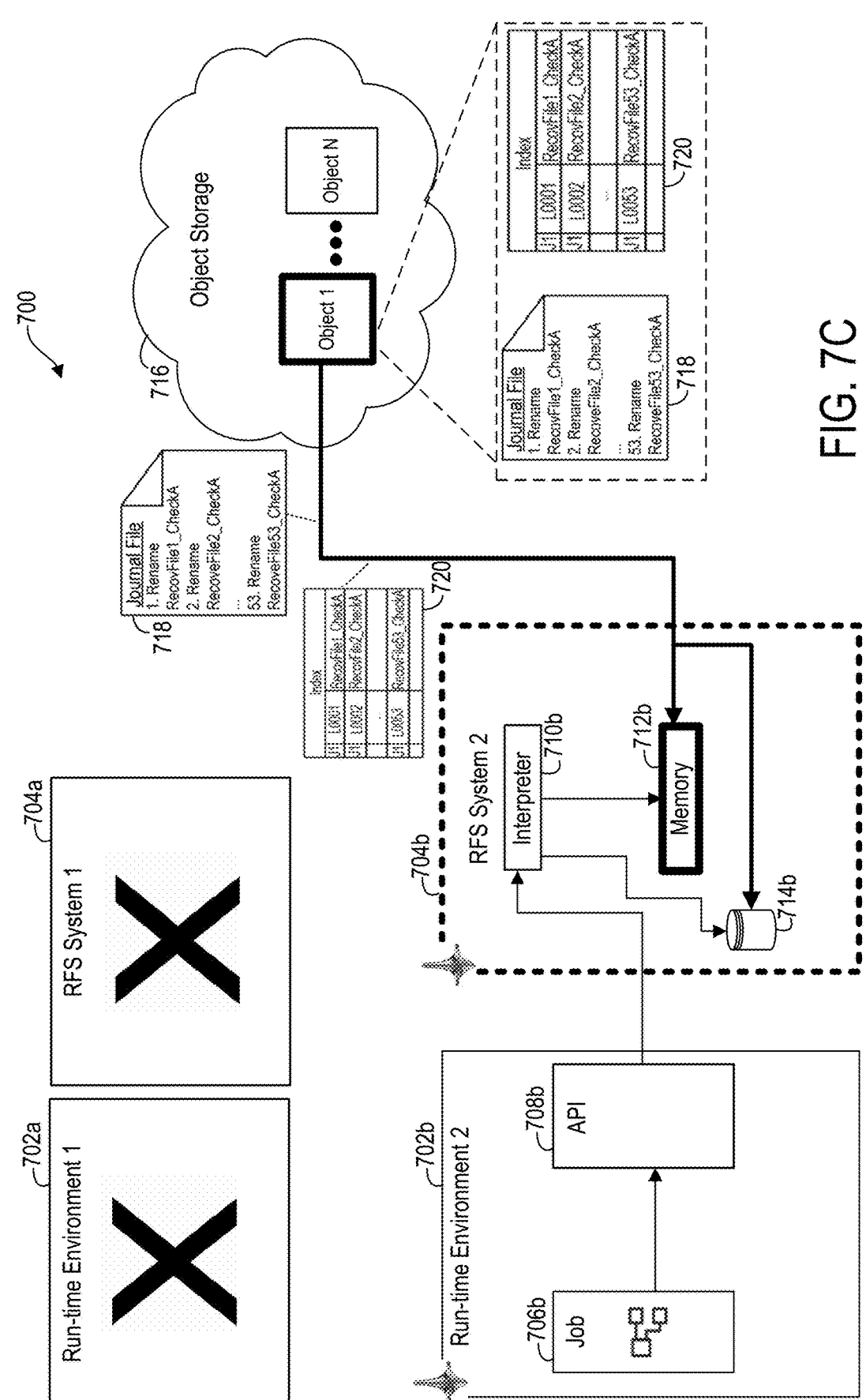

FIG. 7C shows a failure of the run-time environment 702a and the RFS system 704a. As previously described, a second RFS system 704b is instantiated with a respective interpreter 710b, respective memory 712b, and respective data store 714b for replacing the operations of RFS system 704a. The RFS system 704b retrieves the journal file 718 and index 720 and stores them in the memory 712b and the data store 714b. A second run-time environment 702b includes a restarted job 706b and an API 708b.

Figure 7D:
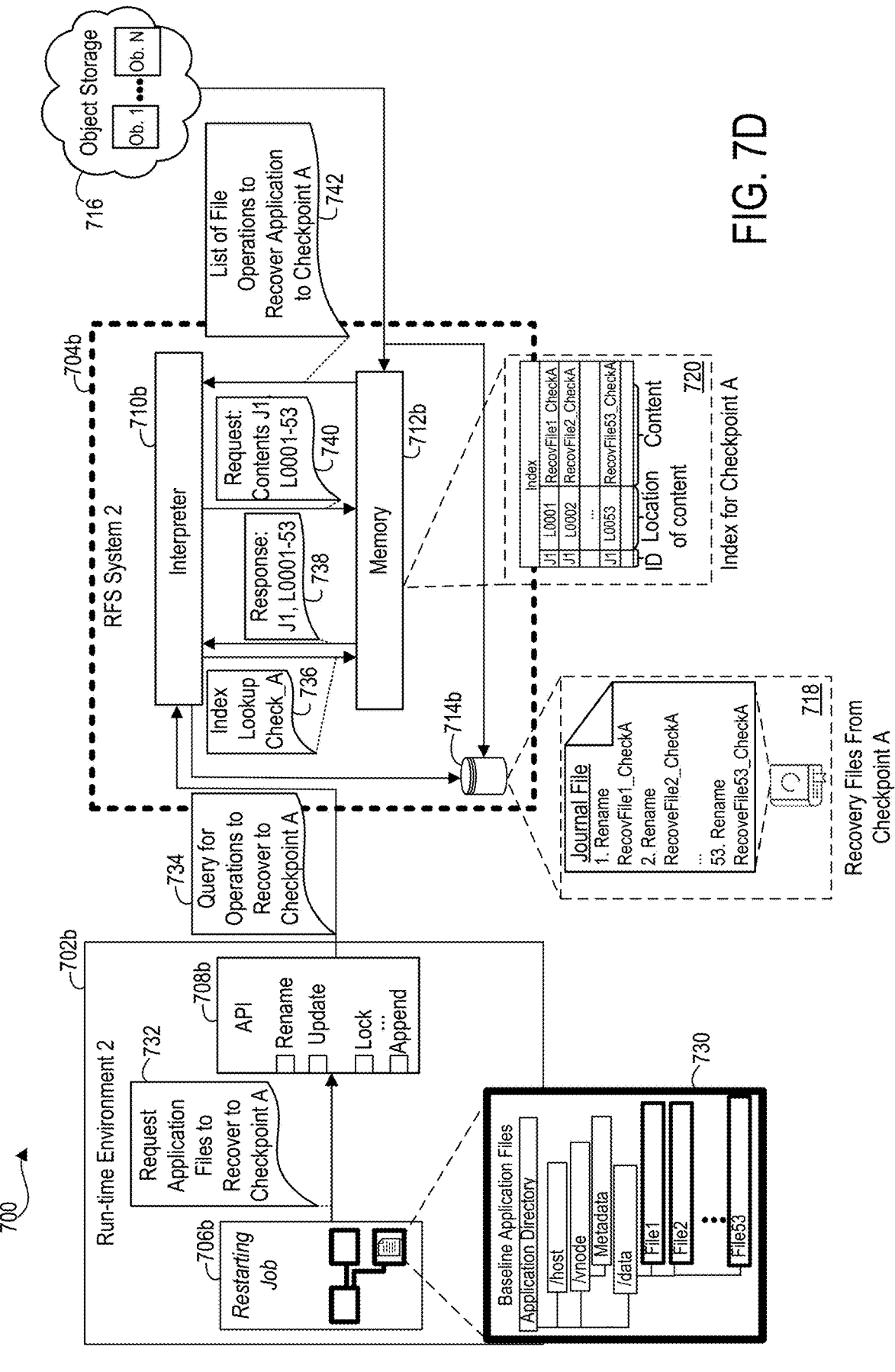

FIG. 7D shows a system 700 in which a request 732 to reconstitute the application files back to checkpoint A at the restarting job 706b. The job 706b sends a request 732 to recover the application files for checkpoint A. The API 708b receives the request 732 and generates a query 734 for sending to the interpreter 710b of RFS 704b. The interpreter 710b generates an instruction 736 to look up in the index 720 where the operations for checkpoint A are recorded in the journal file 718. The memory 712b sends a response 738 that specifies the locations in the journal file that correspond to the operations for checkpoint A. In this example, the locations include addresses L0001-L0053. The interpreter 710b sends a request to the data store 714b for accessing the addresses specified by the index 720. The interpreter 710b receives the corresponding list 742 of operations to recover the application to checkpoint A. in this example, the operations include renaming files "File 1 . . . File 53" of the baseline application files 730 to respectively be renamed "RecovFile1_CheckA . . . RecovFile53_CheckA". These rename operations are returned to the run-time environment 702 B as shown in FIG. 7E.

Figure 7E:
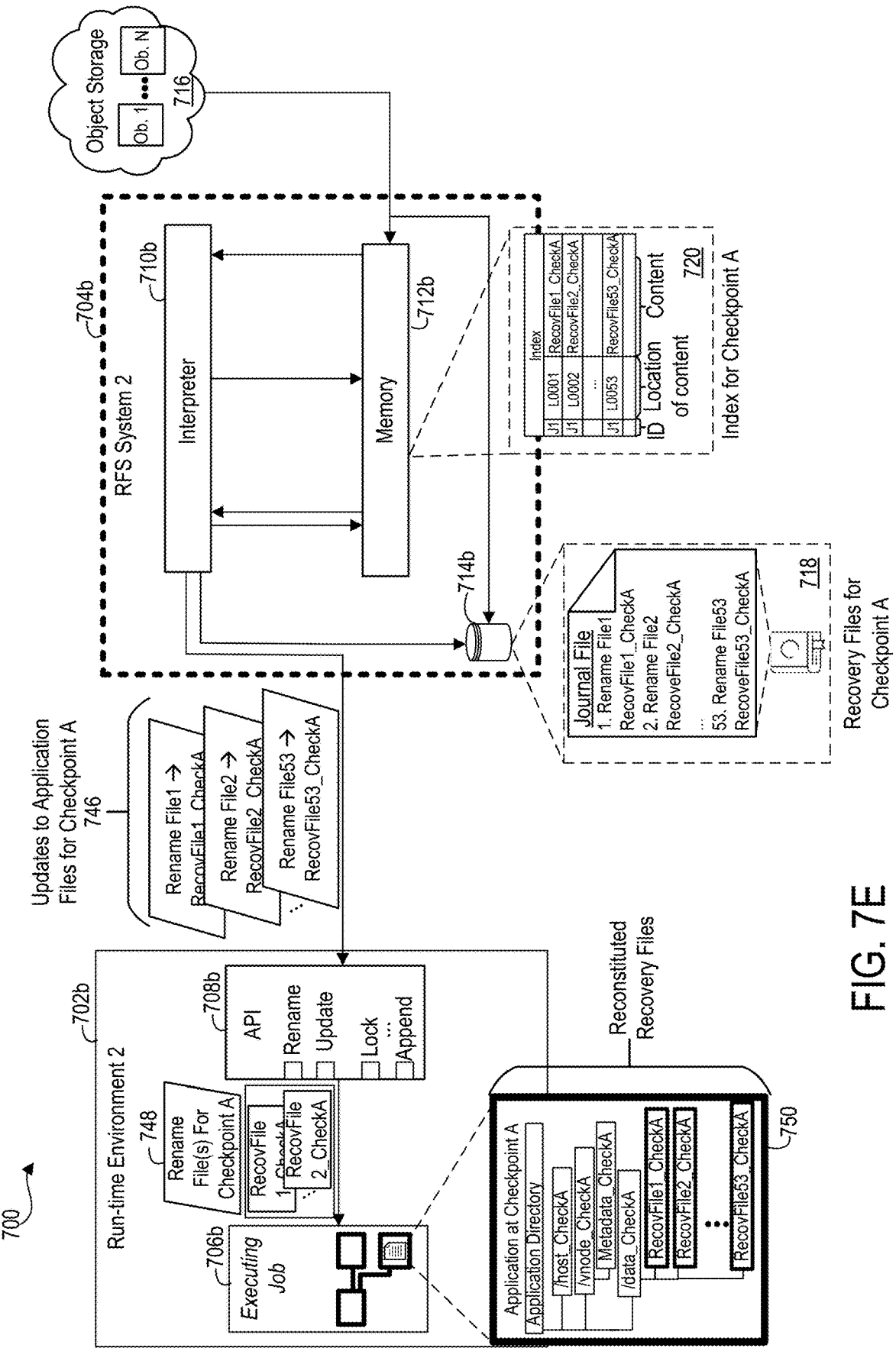

FIG. 7E shows a system 700 in which the RFS system 704b returns the list of operations 746 to the run-time environment 702b for recovering the executing job 706b back to checkpoint A. The API 708b receives the list of operations 746 and generates instructions 748 to rename the data in the baseline application data 730 of the application directory. The executing job 706b performs the operations of the instructions 748 and generates reconstituted recovery files 750 that represent the application at checkpoint A. The job 706b can proceed to execute and has recovered from the failure.

FIG. 8 is a flow diagram depicting a process 800 implemented by one or more data processing systems (such as those described in relation to FIGS. 1C-7E) to enable usage of a cloud object storage for storing data accessed based on execution of one or more file operations that are unsupported by the cloud object storage. The process 800 includes executing (802), by a data processing system, an application, wherein the application is configured to access application data for recoverability of a state of the application. As the application executes, the process 800 includes generating (804) one or more instructions to perform one or more operations to update the application data, wherein the one or more operations are unsupported by cloud object storage. The process 800 includes transmitting (806) the one or more generated instructions to a location representing cloud object storage. The process 800 includes recording (808), at the location, an indication of the one or more operations specified by the one or more instructions. The process 800 includes transmitting (810), from the location to the cloud object storage, the indication. The process 800 includes enabling (812), by transmittal of the indication to cloud object storage, another data processing system to recover a state of the application by: retrieving (814), from cloud object storage, the indication of the one or more operations to be performed to update the application data, performing (816) the one or more operations on the one or more application files to update the application data, and recovering (818) the state of the application based on the application data.

In some implementations, the other data processing system is the data processing system executing the application.

In some implementations, transmitting the one or more generated instructions to a location representing cloud object storage includes: transmitting the one or more generated instructions to cloud object storage; intercepting the one or more generated instructions that are transmitted; generating an index specifying a given application file and a location in a journal file pertaining to the given application file; and identifying which one or more application files are needed for recoverability of the application.

In some implementations, the process 800 includes receiving a request for recoverability data; retrieving, from the cloud object storage, the indication of the one or more operations specified by the one or more instructions; and re-constructing the recoverability data in accordance with the indication of the one or more operations specified by the one or more instructions.

In some implementations, the process 800 includes sending, to a restarted data processing system, data representing one or more operations for recovering a job for execution on the restarted data processing system.

In some implementations, the one or more operations that are unsupported by the cloud object storage include an instruction to update a structure of files of the application.

In some implementations, the one or more operations that are unsupported by the cloud object storage include an instruction to update a structure of files of the application.

In some implementations, the one or more generated instructions represent operations to restore the application to a checkpointed state.

In some implementations, recording, at the location, the indication of the one or more operations specified by the one or more instructions includes generating one or more journal files that journal a list of the one or more operations.

In some implementations, the journal file is associated with a journal index that specifies a location in the journal file corresponding to at least one application file of the application files.

In some implementations, the process 800 includes specifying the location based on a directory tag, the directory tag indicating a directory for storing application files by the application.

In some implementations, the location representing cloud object storage is at a server remote from the data processing system executing the application.

In some implementations, the location representing cloud object storage is part of the data processing system executing the application.

In some implementations, the location representing cloud object storage stores the application files as logical files, the logical files representing a directory of the application files stored at the data processing system, the logical files configured to be reconstituted based on the one or more operations specified by the one or more instructions.

In some implementations, the process 800 includes generating an instruction specifying a particular location representing the cloud object storage, the particular location being one of a set of available locations representing the cloud object storage.

In some implementations, transmitting, from the location to the cloud object storage, the indication is responsive to a commit checkpoint instruction received from the data processing system.

In some implementations, the process 800 is implemented by one or more data processing systems to enable usage of a cloud object storage for storing data accessed based on execution of one or more file operations that are unsupported by the cloud object storage. The process 800 includes executing, by a first data processing system, an application, wherein the application is configured to access application data; as the application executes, generating one or more instructions to perform one or more operations to modify the application data, wherein the one or more operations are unsupported by cloud object storage; transmitting the one or more instructions to a first file service system representing a location for the application data to be stored in cloud object storage; recording, at the first file service system, an indication of the one or more operations specified by the one or more instructions; and transmitting, from the first file service system to the cloud object storage, the indication of the one or more operations specified by the one or more instructions, whereby transmittal of the indication to cloud object storage enables a second data processing system to access the application data that is modified in accordance with the one or more operations unsupported by cloud object storage.

Figure 9:
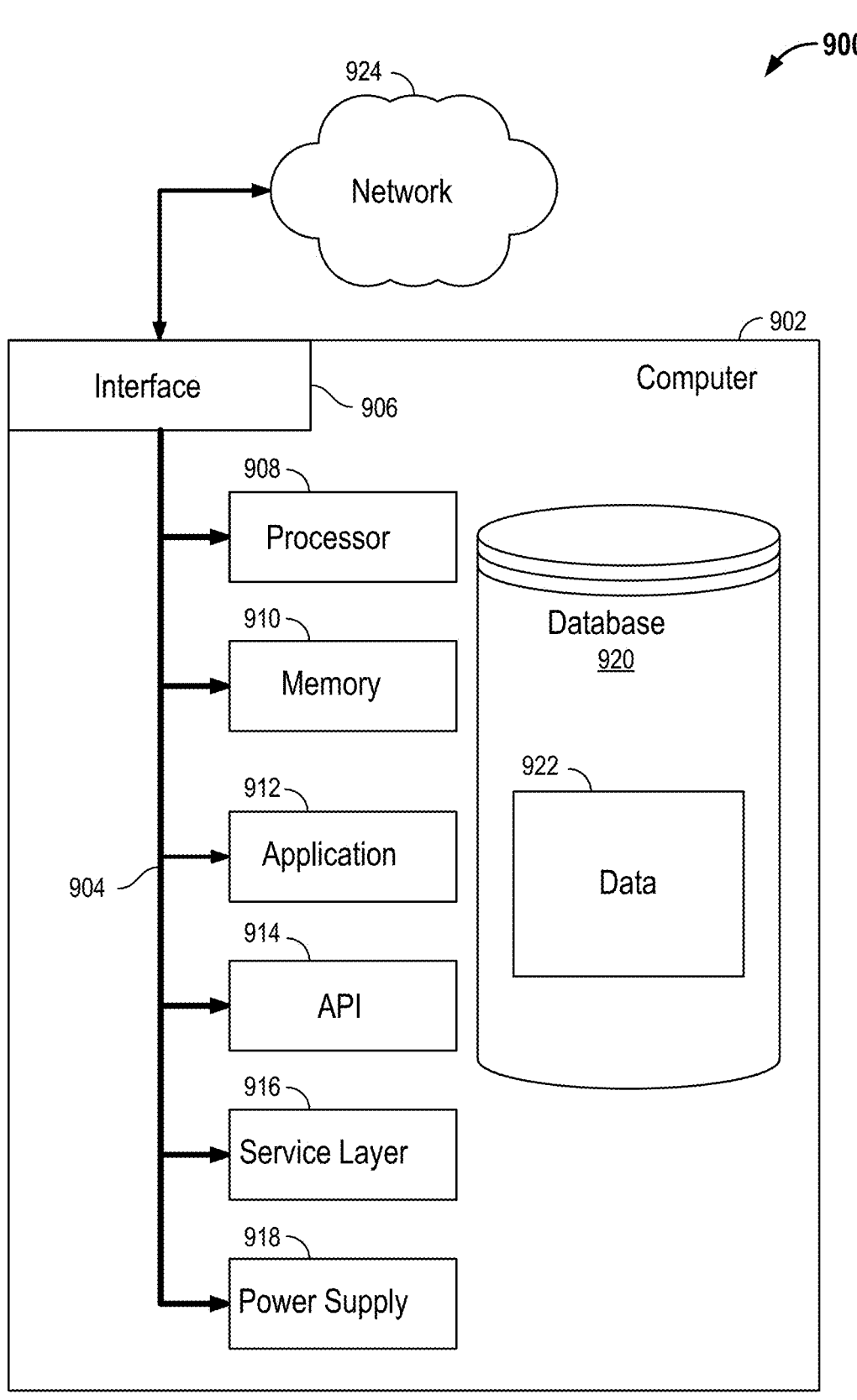
FIG. 9 is a diagram showing details of a computer system, such as a data processing system.

Referring to FIG. 9, an example operating environment for implementing embodiments of the present invention is shown and designated generally as computing device 900. Essential elements of a computing device 900 or a computer or data processing system or client or server are one or more programmable processors 922 for performing actions in accordance with instructions and one or more memory devices 924 for storing instructions and data. Generally, a computer will also include, or be operatively coupled, (via bus 921, fabric, network, etc.) to I/O components 926, e.g., display devices, network/communication subsystems, etc. (not shown) and one or more mass storage devices 928 for storing data and instructions, etc., and a network communication subsystem 930, which are powered by a power supply (not shown). In memory device 924, are an operating system 932 and applications 934 for application programming.

Devices suitable for storing computer program instructions and data include all forms of non-volatile memory, media and memory devices including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification are implemented on a computer having; a display device (monitor), for displaying information to the user, a keyboard, and a pointing device (e.g., a mouse or a trackball) by which the user can provide input to the computer. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification includes many specific implementation details, these should not be construed as limitations on the scope of any inventions or of what may be claimed, but rather as descriptions of features specific to embodiments of particular inventions.

Similarly, while operations are depicted in the drawings in a particular order, this should not be understood as requiring that such operations be performed in the order shown or in sequential order, or that all illustrated operations be performed, to achieve desirable results. Moreover, the separation of various system components in the embodiments described above should not be understood as requiring such separation in all embodiments, and the described program components and systems can generally be integrated together in a single software product or packaged into multiple software products.

Several embodiments have been described. Nevertheless, it will be understood that various modifications may be made without departing from the scope of the techniques described herein. For example, some of the steps described above may be order independent, and thus can be performed in an order different from that described. Additionally, any of the foregoing techniques described regarding a dataflow graph can also be implemented and executed regarding a program. Accordingly, other embodiments are within the scope of the following claims.

What is claimed is:

1. A method implemented by one or more data processing systems to enable usage of a cloud object storage for storing data accessed based on execution of one or more file operations that are unsupported by the cloud object storage, the method including:

executing, by a data processing system, an application, wherein the application is configured to access application files;

wherein the application indicates, to a file service system, a location of cloud object storage for storing the application files;

wherein the file service system is configured to:

record an indication of one or more operations to modify the application files, wherein the one or more modification operations are unsupported by the cloud object storage, and store the indication in the location of the cloud object storage to enable recovery of the modified application files;

as the application executes, generating one or more instructions to perform the one or more operations to modify the application files, wherein the one or more operations are unsupported by the cloud object storage;

transmitting the one or more instructions to the file service system, the file service system representing the location of the cloud object storage;

recording, at the file service system, an indication of the one or more operations specified by the one or more instructions; and transmitting, from the file service system to the location of the cloud object storage, the indication of the one or more operations specified by the one or more instructions, whereby transmittal of the indication to the location of the cloud object storage enables another data processing system to recover the application files that are modified in accordance with the one or more operations unsupported by the cloud object storage.

2. The method of claim 1, further including:

recovering, by the other data processing system, a state of the application when the application failed by performing operations including:

retrieving, from the cloud object storage, the indication of one or more operations to modify the application files, the one or more operations updating the application files to be at the state of the application when the application failed;

performing the one or more file operations on the application files to update the application files; and recovering the state of the application based on the updated application files.

3. The method of claim 1, wherein the one or more instructions include Portable Operating System Interface (POSIX) operations.

4. The method of claim 1, wherein transmitting the one or more instructions to the file service system includes:

transmitting the one or more instructions to the location in the cloud object storage;

intercepting, by the file service system, the one or more instructions that are transmitted;

generating, at the file service system, an index specifying a given application file and a location in a journal file pertaining to an application file of the application files; and identifying which application files specified by the index are needed for recoverability of the application.

5. The method of claim 1, further including:

receiving a request for recoverability data;

retrieving, from the cloud object storage, the indication of the one or more operations specified by the one or more instructions; and re-constructing the recoverability data in accordance with the indication of the one or more operations specified by the one or more instructions.

6. The method of claim 5, further including:

sending, to a restarted data processing system, data representing one or more operations for recovering a job for execution on the restarted data processing system.

7. The method of claim 1, wherein the one or more operations include file operations that are unsupported by the cloud object storage.

8. The method of claim 1, wherein the one or more operations include an instruction to update a structure of application files of the application.

9. The method of claim 1, wherein the one or more instructions represent operations to restore the application to a checkpointed state.

10. The method of claim 1, wherein recording, at the first file service system, the indication of the one or more operations specified by the one or more instructions includes generating one or more journal files that include a list of the one or more operations.

11. The method of claim 10, wherein the one or more journal files are associated with a journal index that specifies a location in the one or more journal files corresponding to at least one application file of the application files.

12. The method of claim 1, wherein the indication of the location includes a directory tag indicating a directory for storing the application files in the cloud object storage.

13. The method of claim 1, wherein the file service system stores the application files as logical files, representing at least one directory at the data processing system, the logical files configured to be reconstituted based on the one or more file operations specified by the one or more instructions.

14. The method of claim 1, further including selecting a particular file service system for performing the one or more operations to modify the application files, the particular first file service system being one of a set of available file service systems.

15. The method of claim 1, wherein transmitting, from the file service system to the cloud object storage, the indication of the one or more operations is responsive to a commit checkpoint instruction received at the file service system from the data processing system.

16. The method of claim 1, wherein transmitting the one or more instructions to the file service system occurs asynchronously with respect to transmittal of other generated instructions by other executing instances of the application to the file service system; and where transmitting the indication, from the file service system to the cloud object storage, occurs synchronously with at least one transmission of other indications of operations for modifying the application files to the location of the cloud object storage.

17. The method of claim 1, wherein the file service system is a first file service system, the method further including:

initializing a second file service system;

transmitting the one or more instructions to the first file service system representing the location of the cloud object storage;

transmitting the one or more instructions to the second file service system representing the location of the cloud object storage; and determining, at a synchronization system, that the first file service system and the second file service system are synchronized when each of the one or more instructions to modify the application files received by the first file service system is also received by the second file service system, wherein the determining by the synchronization system enables recovery of the modified application files.

18. The method of claim 17, further including:

determining that the first file service system is offline;

determining that the second file service system has not received each of the one or more instructions received by the first file service system;

causing the application to roll back execution of the application to a previous state corresponding to a synchronization between the first file service system and the second file service system; and causing the application to restart at the previous state, the application being configured to transmit one or more additional instructions to modify the application files to the second file service system as the application restarts execution.

19. A system for enabling a usage of a cloud object storage for storing data accessed based on execution of one or more file operations that are unsupported by the cloud object storage, the system comprising:

one or more processors; and a memory storing instructions that, when executed by one or more processors, cause the one or more processors to perform operations including:

executing, by a data processing system, an application, wherein the application is configured to access application files;

wherein the application indicates, to a file service system, a location of cloud object storage for storing the application files;

wherein the file service system is configured to:

record an indication of one or more operations to modify the application files, wherein the one or more modification operations are unsupported by the cloud object storage, and store the indication in the location of the cloud object storage to enable recovery of the modified application files;

as the application executes, generating one or more instructions to perform the one or more operations to modify the application files, wherein the one or more operations are unsupported by the cloud object storage;

transmitting the one or more instructions to the file service system, the file service system representing the location of the cloud object storage;

recording, at the file service system, an indication of the one or more operations specified by the one or more instructions; and transmitting, from the file service system to the location of the cloud object storage, the indication of the one or more operations specified by the one or more instructions, whereby transmittal of the indication to the location of the cloud object storage enables a another data processing system to recover the application files that are modified in accordance with the one or more operations unsupported by the cloud object storage.

20. The system of claim 19, the operations further including:

recovering, by the other data processing system, a state of the application when the application failed by performing operations including:

retrieving, from the cloud object storage, the indication of one or more operations to modify the application files, the one or more operations updating the application files to be at the state of the application when the application failed;

performing the one or more file operations on the application files to update the application files; and recovering the state of the application based on the updated application files.

21. The system of claim 19, the operations further including:

receiving a request for recoverability data;

retrieving, from the cloud object storage, the indication of the one or more operations specified by the one or more instructions; and re-constructing the recoverability data in accordance with the indication of the one or more operations specified by the one or more instructions.

22. One or more non-transitory computer-readable hardware storage devices storing instructions for enabling a usage of a cloud object storage for storing data accessed based on execution of one or more file operations that are unsupported by the cloud object storage, that, when the instructions executed by one or more processors, cause the one or more processors to perform operations including:

executing, by a data processing system, an application, wherein the application is configured to access application files;

wherein the application indicates, to a file service system, a location of cloud object storage for storing the application files;

wherein the file service system is configured to:

record an indication of one or more operations to modify the application files, wherein the one or more modification operations are unsupported by the cloud object storage, and store the indication in the location of the cloud object storage to enable recovery of the modified application files;

as the application executes, generating one or more instructions to perform the one or more operations to modify the application files, wherein the one or more operations are unsupported by the cloud object storage;

transmitting the one or more instructions to the file service system, the file service system representing the location of the cloud object storage;

recording, at the file service system, an indication of the one or more operations specified by the one or more instructions; and transmitting, from the file service system to the location of the cloud object storage, the indication of the one or more operations specified by the one or more instructions, whereby transmittal of the indication to the location of the cloud object storage enables another data processing system to recover the application files that are modified in accordance with the one or more operations unsupported by the cloud object storage.

23. The one or more non-transitory computer-readable hardware storage devices of claim 22, the operations further including:

recovering, by the other data processing system, a state of the application when the application failed by performing operations including:

retrieving, from the cloud object storage, the indication of one or more operations to modify the application files, the one or more operations updating the application files to be at the state of the application when the application failed;

performing the one or more file operations on the application files to update the application files; and

recovering the state of the application based on the updated application files.

24. The one or more non-transitory computer-readable hardware storage devices of claim 22, the operations further including:

receiving a request for recoverability data;

retrieving, from the cloud object storage, the indication of the one or more operations specified by the one or more instructions; and re-constructing the recoverability data in accordance with the indication of the one or more operations specified by the one or more instructions.

\* \* \* \* \*